United States Patent
Seo et al.

(10) Patent No.: US 6,950,261 B2
(45) Date of Patent: Sep. 27, 2005

(54) MAGNETIC PATTERN FORMING METHOD, MAGNETIC PATTERN FORMING APPARATUS, MAGNETIC DISK, AND MAGNETIC RECORDING APPARATUS

(75) Inventors: Yuzo Seo, Kanagawa (JP); Hiroyuki Ikeda, Kanagawa (JP); Takeshi Kuriwada, Kanagawa (JP); Toshihiko Kuriyama, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 604 days.

(21) Appl. No.: 10/058,872

(22) Filed: Jan. 24, 2002

(65) Prior Publication Data

US 2002/0097640 A1 Jul. 25, 2002

(30) Foreign Application Priority Data

Jan. 24, 2001 (JP) .................................... 2001-015824

(51) Int. Cl.⁷ ................................................ G11B 5/02
(52) U.S. Cl. .................................... 360/59; 369/13.02
(58) Field of Search .................. 360/15, 59; 369/13.02, 369/13.04, 13.14, 13.15, 13.16, 13.17, 13.22, 13.24, 13.25

(56) References Cited

U.S. PATENT DOCUMENTS

| | | | |
|---|---|---|---|
| 3,869,711 A | | 3/1975 | Bernard |
| 5,248,990 A | | 9/1993 | Ishikawa et al. |
| 5,325,244 A | | 6/1994 | Takano et al. |
| 5,390,162 A | * | 2/1995 | Fukumoto et al. ........ 369/275.2 |
| 5,991,104 A | | 11/1999 | Bonyhard |
| 6,359,747 B1 | | 3/2002 | Kuo |
| 6,377,413 B1 | * | 4/2002 | Sacks et al. ................... 360/48 |
| 6,377,414 B1 | * | 4/2002 | Wang ........................... 360/59 |
| 6,731,446 B2 | * | 5/2004 | Ikeda et al. .................... 360/59 |
| 6,770,387 B2 | * | 8/2004 | Tanaka et al. ........... 369/13.46 |
| 2002/0118477 A1 | | 8/2002 | Ikeda | |

FOREIGN PATENT DOCUMENTS

| | | |
|---|---|---|
| EP | 0 125 535 A2 | 11/1984 |
| EP | 0 915 456 A1 | 5/1999 |
| JP | 60-64376 | 4/1985 |
| JP | 62-043816 | 2/1987 |
| JP | 62-192025 | 8/1987 |
| JP | 63-166050 | 7/1988 |
| JP | 4-34744 | 2/1992 |
| WO | 99/30318 | 6/1999 |
| WO | 01/35396 | 5/2001 |

OTHER PUBLICATIONS

M. Nishikawa, et al., "Readback Properties of novel magnetic contact duplication signal with high recording density FD ( Digest of InterMag 2000, GT–06)" Apr. 2000.

(Continued)

*Primary Examiner*—Thang V. Tran
*Assistant Examiner*—Bach Vuong
(74) *Attorney, Agent, or Firm*—Katten Muchin Roseman LLP

(57) ABSTRACT

A magnetic pattern forming apparatus, which is designed to form a desired magnetic pattern on a magnetic disk having a magnetic layer on a substrate, is made up of a mask having a pattern identical or similar to the desired magnetic pattern, a projection optical system for exposing the magnetic disk to a spot-like energy beam coming through the mask to heat the magnetic layer for projecting the mask pattern to the magnetic disk at a one-to-one ratio or a predetermined reduction ratio, a magnetic field applying device for applying an external magnetic field to the magnetic disk, a control unit for conducting scanning with the spot-like energy beam with respect to the magnetic disk and the mask in their radial directions while rotating the magnetic disk and the mask.

30 Claims, 10 Drawing Sheets

OTHER PUBLICATIONS

H. Horimai, et al., "High–Density Storage by Means of Magnetic Holography on Amorphous Tb–Fe ThinFilms (The 7th Annual Conference on Magnetics in Japan)" p. 223, Nov. 1983.

" A New Magnetic Printing Technology for Hard Disk Media (DISKON USA 2001)" Sep. 18–20, 2001 pp. 1–8.

L. Wang, et al. "HD–01 Photo Thermal Patterning on Magnetic Media (46th Annual Conference on Magnetism & Magnetic Materials)" Nov. 12–16, 2001.

U.S. Appl. No. 09/854,679, filed May 15, 2001.

U.S. Appl. No. 09/773,610, filed Feb. 2, 2001.

* cited by examiner

MAGNETIC PATTERN FORMING METHOD, MAGNETIC PATTERN FORMING APPARATUS, MAGNETIC DISK, AND MAGNETIC RECORDING APPARATUS

BACKGROUND OF THE INVENTION (1) Field of the Invention

The present invention relates to a magnetic pattern forming method and apparatus for use in a magnetic recording apparatus (magnetic disk), and more particularly to a magnetic pattern forming method and apparatus, magnetic disk and magnetic recording apparatus suitable for recording/reproduction (readout) by a flying/contact head.

(2) Description of the Related Art

Magnetic recording apparatus represented by a magnetic disk unit (hard disk drive) have come into widespread use as an external storage of information processing equipment such as computers, and in the recent years, they are being used as a moving-picture recording apparatus or a recording apparatus for a set-top box.

The magnetic disk unit (hard disk drive) is usually made up of a shaft for fixing one magnetic disk or a plurality of magnetic disks in a skewering manner, a motor for turning the magnetic disk joined through a bearing to the shaft, a magnetic head to be used for recording and/or reproduction, an arm for holding the head, and an actuator capable of shifting the head through the head arm to an arbitrary position above a magnetic recording medium, with the recording/reproducing head being moved at a constant flying quantity above the magnetic recording medium.

Furthermore, in addition to the flying head, there has been proposed the employment of a contact head which contributes to shortening the distance with respect to a medium.

A magnetic recording medium to be mounted on the magnetic disk unit is produced by forming an NiP layer on a surface of a substrate made usually from an aluminum alloy or the like and then forming successively a metal under layer, a magnetic layer (information recording layer), a protective layer, a lubricant layer and other layers thereon after undergoing needed smoothing treatment, texturing treatment and others. Alternatively, it is made by forming successively a metal under layer, a magnetic layer (information recording layer), a protective layer, a lubricant layer and others on a surface of a substrate made of a glass or the like. Among the magnetic recording media, there are a longitudinal magnetic recording medium and a perpendicular magnetic recording medium. In general, longitudinal recording is made on the longitudinal magnetic recording medium.

The protective layer on the magnetic layer prevents the magnetic layer from being damaged due to collision of the flying magnetic head or sliding contact of the contact head, and the lubricant layer provides lubricity between the magnetic head and the medium. This construction enables recording/reproduction by a flying/contact magnetic head. Since the employment of a flying/contact head shortens the distance between the magnetic layer and the head, the considerably higher density information recording becomes feasible, as compared with an optical disk, magneto optical disk or the like using a different type of head.

The magnetic recording medium shows a yearly increase in density, and for realizing this, there have been known a variety of techniques. For example, the approaches involve reducing the flying quantity of a magnetic head, employing a GMR head as a magnetic head, using a high-corecivity magnetic material for a recording layer of a magnetic disk, or reducing the space between information recording tracks on a magnetic disk. For example, for 100 Gbit/inch$^2$, it is said that the track density is necessary to be equal to or more than 100 ktpi.

Each track has a control magnetic pattern formed for control of the magnetic head, for example, a signal for position control of the magnetic head or a signal for synchronous control. An increase in the number of tracks by a reduction of the space of the information recording tracks requires that signals (which sometimes will be referred to hereinafter as "servo signals") for position control of data recording/reproducing head are accordingly located radially and densely, that is, the signals are more placed, for more precise control.

In addition, there is an increasing requirement for enlarging a data recording area by reducing an area other than for data recording, that is, an area for servo signals and a gap section between the servo area and the data recording area, thus enhancing the data recording capacity. This requires the enhancement in the output of the servo signal or the accuracy of the synchronization signal.

A conventional method used widely for production involves making a hole in the vicinity of a head actuator of a drive (magnetic recording apparatus) to insert a pin with an encoder thereinto for establishing the engagement with the actuator through the pin, thereby moving a head up to a correct position for recording a servo signal. However, since the center of gravity of the positioning mechanism and the center of gravity of the actuator exist at different positions, difficulty is encountered in executing track position control with high accuracy and recording a servo signal with a high precision.

In addition, there has been proposed a technique for formation of irregular servo signals in which a laser beam is placed onto a magnetic disk to deform a disk surface locally for formation of physical irregularities. There are problems which arises with this technique, however, in that an unstable state of a flying head due to the irregularities exerts adverse influence on recording/reproduction, cost rises because there is a need to use a high-power laser beam for the formation of the irregularities, and the one-by-one formation of the irregularities is time-consuming.

New servo signal formation methods have been proposed with a view to eliminating these problems.

As one example, there has been known a method in which a servo pattern is formed on a master disk with a high-corecivity magnetic layer and this master disk is brought closely into contact with a magnetic recording medium so that the magnetic pattern is printed thereon by means of an auxiliary magnetic field from the external (see U.S. Pat. No. 5,991,104).

Another example is that, in a state where a medium is previously magnetized in one direction, a soft magnetic layer with a high permeability but a low corecivity is placed on a master disk in the form of a pattern and the master disk is brought closely into contact with the medium while an external magnetic field is brought to strike thereon. In this example, the soft magnetic layer serves as a shield, and the magnetic pattern is printed in the non-shielded area (see U.S. Pat. No. 3,869,711, EP915456, Digest of InterMag 2000, GP-06).

This technique features the employment of a master disk and the formation of a magnetic pattern on a medium by a strong magnetic field.

In general, since the strength or magnitude of a magnetic field depends upon distance, in recording a magnetic pattern through the use of a magnetic field, the pattern boundary tends to be unclear due to stray magnetic field. In order to minimize the stray magnetic field, it is essential to make the master disk and the medium come closely into contact with each other. Moreover, it is necessary that, as the pattern becomes finer, they are accordingly brought completely into contact with each other without defining a gap therebetween, and usually, they are pressed against each other through the use of vacuum adhesion or the like.

In addition, the magnetic field to be used for print increases as the corecivity of a medium becomes higher, and the stray magnetic field increases consequently; therefore, there is a need to achieve the contact therebetween more completely.

Thus, although the above-mentioned technique is relatively applicable to a flexible floppy disk easy to press or a low-corecivity magnetic disk which does not require too great contact, considerable difficulty is experienced in applying it to a high-density recording magnetic disk using a hard substrate, whose corecivity exceeds 3000 Oe.

That is, in the case of the magnetic disk using a hard substrate, there is a possibility that microscopic dirt particles or the like get between the master disk and the medium at the contact to produce defects on the medium or damage the high-priced master disk. In particular, for a glass substrate, the contact therebetween does not reach satisfaction because the dirt particles get therebetween, which makes the magnetic print impossible or causes cracks on the magnetic recording medium.

Furthermore, with the technique disclosed in U.S. Pat. No. 3,869,711, although a pattern formed obliquely with respect to a track direction of a disk is recordable, the recording is limited to the formation of only a pattern with a low signal strength. For a magnetic recording medium with a high corecivity exceeding 2000 to 2500 Oe, in order to secure a magnetic field strength for print, a soft magnetic material such as a permalloy or cendust, which has a high saturated magnetic flux density, is used unavoidably as a ferromagnetic material (shield material) for a pattern of a master disk.

However, in the case of the oblique pattern, a magnetic field for the reverse magnetization becomes perpendicular to a gap defined by the ferromagnetic layer of the master disk, which makes it difficult to tilt the magnetization in a desired direction. In consequence, a part of the magnetic field escapes to the ferromagnetic layer to make it difficult to expose a desired portion to a sufficient magnetic field at magnetic print so that a sufficient reverse magnetization pattern is difficult to form and a high signal strength is hard to obtain. In the case of such an oblique magnetic pattern, its reproduction output drops significantly beyond the azimuth loss with respect to a pattern perpendicular to a track.

On the other hand, a technique disclosed in Japanese Patent Application Nos. 2000-134608 and 2000-134611 relates to the formation of a magnetic pattern on a magnetic recording medium by means of a combination of local heating and exposure to an external magnetic field. For example, in a state where a medium is previously magnetized in one direction, an energy beam or like is applied through a patterned mask thereonto for the local heating and an external magnetic field is brought to strike thereon while the corecivity of the heated area is lowered, thus making recording on the heated area by the external magnetic field for formation of a magnetic pattern.

According to this technique, since the external magnetic field is brought to strike on a medium while the corecivity is lowered by heating, there is no need for the external magnetic field to be higher than the corecivity of the medium, and the recording becomes feasible with a weak magnetic field. Moreover, since the area subjected to recording is limited to the heating area while the recording in other than the heating area cannot be made even if a magnetic field is brought to strike thereon, the recording of a clear magnetic pattern is possible without bringing a mask or the like into contact with the medium. This can prevent the medium or the mask from being damaged due to the press, thus suppressing the defects appearing on the medium.

In addition, this technique enables the formation of a satisfactory oblique magnetic pattern. This is because there is no need to shield the external magnetic field with a soft magnetic material of the master disk unlike the conventional art.

Thus, the magnetic pattern forming technique disclosed in Japanese Patent Application Nos. 2000-134608 and 2000-134611 is a superior technique which can efficiently form various minute magnetic patterns with high accuracy and suppress the defects of a medium without damaging the medium or a mask.

However, according to this technique, since the accuracy of the magnetic pattern depends upon the mask patterning accuracy to some extent, for the effective use of this technique, there is a need to conduct minute processing on a mask with high accuracy. If the magnetic pattern is made more minute up to 1 to 2 $\mu$m or formed in terms of submicron, because of the limit to the processing accuracy, difficulty can be encountered in patterning a mask with high precision, and the alignment precision between the mask and the medium can deteriorate so that a magnetic pattern cannot be formed with sufficiently high accuracy.

SUMMARY OF THE INVENTION

The present invention has been developed with a view to eliminating the above-mentioned problems, and it is therefore an object of the invention to provide a magnetic pattern forming method and apparatus pertaining to a technique of forming a magnetic pattern on a magnetic recording medium by means of a combination of local heating and exposure to an external magnetic field, and capable of efficiently forming a minute magnetic pattern with higher precision, and in its turn offer a higher-density magnetic disk and magnetic recording apparatus in a small amount of time and at a low cost.

For this purpose, in accordance with a first aspect of the present invention, there is provided a magnetic pattern forming method of forming a desired magnetic pattern on a magnetic disk by applying a spot-like energy beam through a mask to the magnetic disk, having a magnetic layer placed on a substrate, for heating a portion of the magnetic layer concurrently with exposing the heated portion of the magnetic layer to an external magnetic field, comprising the steps of making a scan with the spot-like energy beam in radial directions of the magnetic disk and the mask while rotating the magnetic disk and the mask, and projecting a pattern formed on the mask at a one-to-one ratio (equivalence, neither magnification nor reduction) or a predetermined reduction ratio for the formation of the desired magnetic pattern on the magnetic disk.

With this magnetic pattern forming method according to the invention, in a case in which a magnetic pattern is formed on a magnetic disk by means of a combination of local heating and exposure to an external magnetic field, it is possible to efficiently form a minute magnetic pattern with higher accuracy and, in its turn, to provide a magnetic disk and magnetic recording apparatus, capable of achieving higher-density recording, in a small amount of time and at a low cost.

In addition, instead of the employment of a large-sized illuminating optical system (particularly, light source) or projection optical system, a small-sized and low-priced system can form a magnetic pattern on a magnetic disk briefly and efficiently, which contributes to realizing high productivity.

Furthermore, in accordance with a second aspect of the present invention, there is provided a magnetic pattern forming method of forming a desired magnetic pattern on a magnetic disk by applying a spot-like energy beam through a mask to the magnetic disk, having a magnetic layer placed on a substrate, for heating a portion of the magnetic layer concurrently with exposing the heated portion of the magnetic layer to an external magnetic field, comprising the steps of making a spiral or concentric scan with the spot-like energy beam, and projecting a pattern formed on the mask at a one-to-one ratio or a predetermined reduction ratio for the formation of the desired magnetic pattern on the magnetic disk.

Also with this magnetic pattern forming method according to the invention, in a case in which a magnetic pattern is formed on a magnetic disk by means of a combination of local heating and exposure to an external magnetic field, it is possible to efficiently form a minute magnetic pattern with higher accuracy and, in its turn, to provide a magnetic disk and magnetic recording apparatus, capable of achieving higher-density recording, in a small amount of time and at a low cost.

In addition, instead of the employment of a large-sized illuminating optical system (particularly, light source) or projection optical system, even a small-sized and low-priced system can form a magnetic pattern on a magnetic disk briefly and efficiently, which contributes to realizing high productivity.

In particular, it is preferable that the magnetic layer is previously magnetized evenly in a desired detection by exposing the magnetic disk to the external magnetic field, and the magnetic layer is applyed with the energy beam to be heated and, at the same time, the heated portion of the magnetic layer is exposed to the external magnetic field to be magnetized in a direction opposite to the desired direction for the formation of the desired magnetic pattern on the magnetic disk.

In addition, preferably, for the scan by the energy beam, a disk stage for supporting the magnetic disk and a mask stage for supporting the mask are moved in directions orthogonal to (perpendicularly intersecting) the axis of the energy beam.

Still additionally, in a case in which the magnetic disk and the mask are rotated at speeds equal to each other, a ratio of the mask stage moving speed to the disk stage moving speed is set on the basis of the one-to-one ratio or the predetermined reduction ratio (in accordance with whether the projection is made at the one-to-one ratio or at the predetermined reduction ratio) so that the mask stage and the disk stage are moved on the basis of the speed ratio.

Yet additionally, preferably, an optical system for the projection includes an entrance (part of inlet) positioned in opposed relation to the mask and an exit (part of outlet) positioned in opposed relation to the magnetic disk which are constructed separately, and at the scan with the energy beam, the exit is moved along a surface of the magnetic disk and the entrance is moved along a surface of the mask in synchronism with the movement of the exit.

Moreover, preferably, in a case in which the magnetic disk and the mask are rotated at speeds equal to each other, a ratio of the entrance moving speed to the exit moving speed is set on the basis of the one-to-one ratio or the predetermined reduction ratio so that the entrance and the exit are moved on the basis of the speed ratio.

Still moreover, preferably, the magnetic disk and the mask are rotated coaxially.

Yet moreover, preferably, an optical system for the projection includes an entrance positioned in opposed relation to the mask, an exit part positioned in opposed relation to the magnetic disk and a main part making connection between the entrance and the exit, with the main part being rotated around a supporting point at which the main part is supported, and for the scan by the energy beam, the projection optical system being rotated along surfaces of the magnetic disk and the mask.

Furthermore, preferably, in a case in which the magnetic disk and the mask are rotated at speeds equal to each other, a ratio of a distance between the supporting point and the entrance to a distance between the supporting point and the exit is set on the basis of the one-to-one ratio or the predetermined reduction ratio.

Still furthermore, preferably, the mask is formed according to a mask pattern, and has a transmissive part allowing the energy beam to pass.

Yet furthermore, preferably, a shading plate is interposed between the mask and the magnetic disk.

In addition, preferably, the minimum width of the magnetic pattern is set to be less than or equal to 2 $\mu$m.

Still additionally, preferably, the magnetic pattern includes a servo pattern for positional control of a recording/reproducing head or a standard pattern for recording of the servo pattern.

In a magnetic disk according to the present invention, a magnetic pattern is formed according to the above-mentioned magnetic pattern forming method.

The magnetic disk according to the present invention, in a case in which a magnetic pattern is formed on a magnetic disk by means of a combination of local heating and exposure to an external magnetic field, enables efficient formation of a minute magnetic pattern with higher accuracy. This provides a higher-density magnetic disk and magnetic recording apparatus in a small amount of time and at a low cost.

In this case, without the employment of a large-sized illuminating optical system (particularly, light source) or projection optical system, even a small-sized and low-priced system can form a magnetic pattern on a magnetic disk briefly and efficiently, which contributes to realizing high productivity.

Furthermore, in accordance with a third aspect of the present invention, there is provided a magnetic recording apparatus comprising a magnetic disk, a drive section for driving the magnetic disk in a recording direction, a magnetic head including a recording section and a reproducing section, a moving means for moving the magnetic head relatively to the magnetic disk, and a recording/reproduced signal processing means for making an input of a recording signal to the magnetic head and making an output of a reproduced signal through the magnetic head, with a magnetic pattern being formed on the magnetic disk according to the above-mentioned magnetic pattern forming method.

The magnetic recording apparatus according to the present invention, in a case in which a magnetic pattern is formed on a magnetic disk by means of a combination of local heating and exposure to an external magnetic field, enables efficient formation of a minute magnetic pattern with higher accuracy. This provides a higher-density magnetic disk and magnetic recording apparatus in a small amount of time and at a low cost.

In this case, without the employment of a large-sized illuminating optical system (particularly, light source) or projection optical system, even a small-sized and low-priced system can form a magnetic pattern on a magnetic disk briefly and efficiently, which contributes to realizing high productivity.

Still furthermore, in accordance with a fourth aspect of the present invention, there is provided a magnetic pattern forming apparatus made to form a desired magnetic pattern on a magnetic disk having a magnetic layer on a substrate, the apparatus comprising a mask having a pattern identical or similar to the desired magnetic pattern, a projection optical system for applying a spot-like energy beam, incident through the mask thereon, to the magnetic disk for heating the magnetic layer and for projecting said mask pattern onto said magnetic disk at one of a one-to-one ratio and a predetermined reduction ratio;

magnetic field applying means for exposing the magnetic disk to an external magnetic field, and control means for making a scan with the spot-like energy beam in radial directions of the magnetic disk and the mask while rotating the magnetic disk and the mask.

The magnetic pattern forming apparatus according to the present invention, in a case in which a magnetic pattern is formed on a magnetic disk by means of a combination of local heating and exposure to an external magnetic field, enables efficient formation of a minute magnetic pattern with higher accuracy. This provides a higher-density magnetic disk and magnetic recording apparatus in a small amount of time and at a low cost.

In this case, without the employment of a large-sized illuminating optical system (particularly, light source) or projection optical system, even a small-sized and low-priced system can form a magnetic pattern on a magnetic disk briefly and efficiently, which contributes to realizing high productivity.

Preferably, this magnetic pattern forming apparatus further comprises disk rotating means for driving the magnetic disk rotationally and a mask rotating means for driving the mask rotationally so that the control means controls the disk rotating means and the mask rotating means.

In addition, preferably, the magnetic field applying means is mounted on a tip portion of an exit of the projection optical system.

In particularly, preferably, this magnetic pattern forming apparatus further comprises a disk stage for holding the magnetic disk rotatably and a mask stage for holding the mask rotatably so that the control means moves the disk stage and the mask stage in a synchronized condition with respect to the projection optical system.

Still additionally, preferably, the control means controls rotational speeds of the magnetic disk and the mask to speeds equal to each other, and controls moving speeds of the mask stage and the disk stage on the basis of a ratio of a mask stage moving speed to a disk stage moving speed set on the basis of the one-to-one ratio or the predetermined reduction ratio.

In this case, it is also possible that the control means controls the rotational speeds of the magnetic disk and the mask on the basis of the ratio of the rotational speed of the magnetic disk to the rotational speed of the mask set on the basis of the one-to-one ratio or the predetermined reduction ratio, and controls the moving speeds of the mask stage and the disk stage to an equal speed.

Yet additionally, preferably, the projection optical system includes an entrance positioned in opposed relation to the mask and an exit positioned in opposed relation to the magnetic disk, constructed separately, with the control means controlling the entrance and the exit in a synchronized condition so that the exit moves along a surface of the magnetic disk and the entrance moves along a surface of the mask.

Moreover, preferably, the control means controls the rotational speeds of the magnetic disk and the mask to speeds equal to each other, and controls the moving speeds of the entrance and the exit on the basis of a ratio of the moving speed of the entrance to the moving speed of the exit set on the basis of the one-to-one ratio or the predetermined reduction ratio.

In this case, it is also possible that the control means controls the rotational speeds of the magnetic disk and the mask on the basis of a ratio of the rotational speed of the magnetic disk to the rotational speed of the mask set on the basis of the one-to-one ratio or the predetermined reduction ratio, and controls the moving speeds of the entrance and the exit to an equal speed.

Still moreover, preferably, the magnetic pattern forming apparatus further comprises disk/mask rotating means for rotationally driving the magnetic disk and the mask coaxially so that the control means controls the disk/mask rotating means to make the magnetic disk and the mask rotate at an equal speed.

Yet moreover, preferably, the projection optical system includes an entrance positioned in opposed relation to the mask, an exit positioned in opposed relation to the magnetic disk and a main part making connection between the entrance and the exit so that it is rotatable around a supporting point at which the main part is supported, and the control means rotates the projection optical system so that the exit moves along a surface of the magnetic disk and the entrance moves along a surface of the mask.

In this case, preferably, a ratio of a distance between the supporting point and the entrance to a distance between the supporting point and the exit is set on the basis of the one-to-one ratio or the predetermined reduction ratio, and the control means controls the rotational speeds of the magnetic disk and the mask to an equal speed.

Incidentally, it is also possible that a ratio of a distance between the supporting point and the entrance to a distance between the supporting point and the exit is set at 1 to 1, and the control means controls the rotational speeds of the magnetic disk and the mask on the basis of a ratio of the rotational speed of the magnetic disk to the rotational speed of the mask set on the basis of the one-to-one ratio or the predetermined magnification ratio.

Furthermore, preferably, the mask is formed in accordance with a mask pattern and has a transmissive part allowing the energy beam to pass.

Still furthermore, preferably, a shading plate is interposed between the mask and the magnetic disk.

In addition, preferably, the minimum width of the magnetic pattern is set to be less than or equal to 2 $\mu$m.

Still additionally, preferably, the magnetic pattern includes a servo pattern for positional control of a recording/reproducing head or a standard pattern for recording of the servo pattern.

DESCRIPTION OF THE PREFERRED EMBODIMENTS

Figure 1:
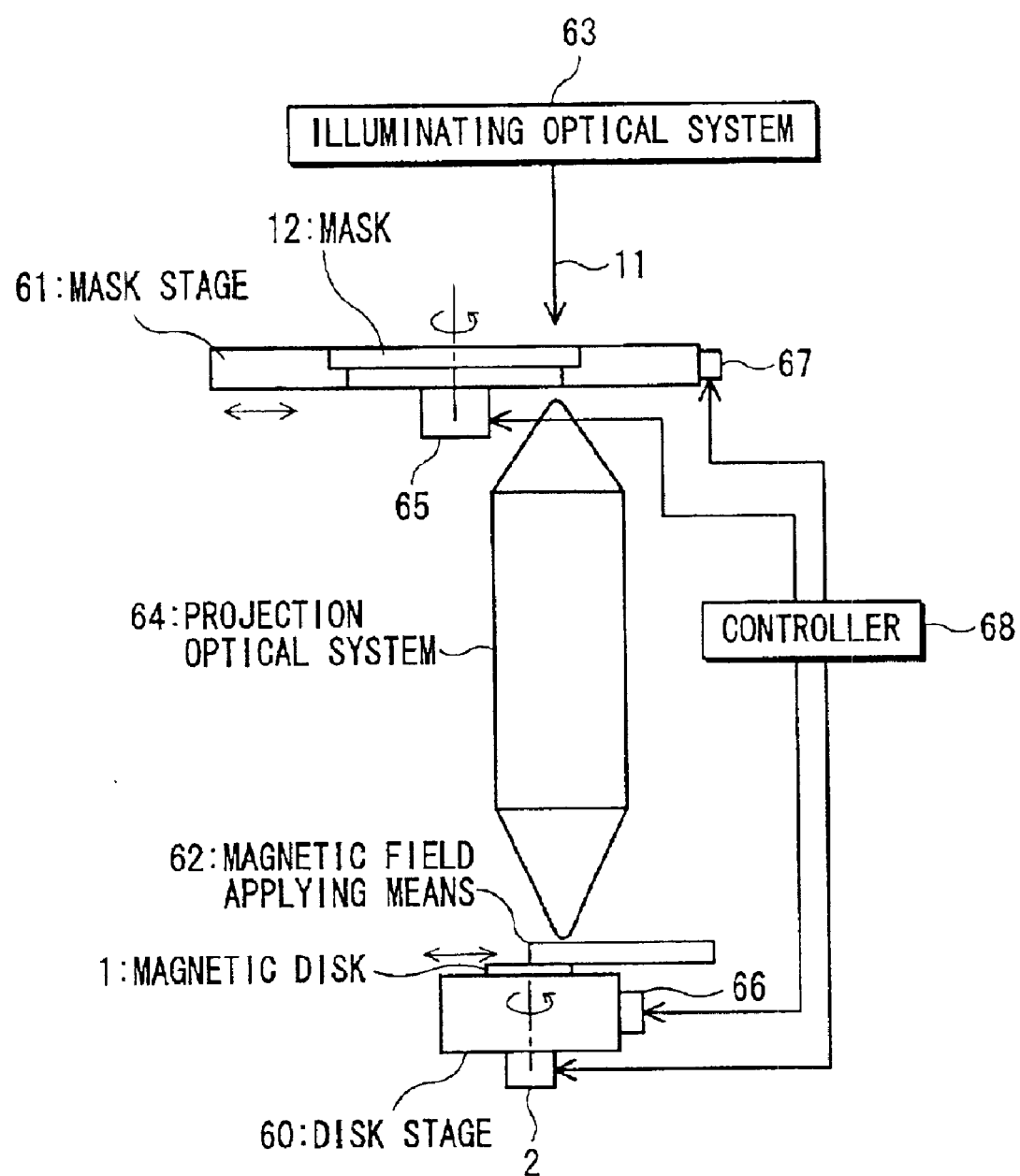
FIG. 1 is an explanatory side elevational view illustratively showing an entire configuration of a magnetic pattern forming apparatus according to a first embodiment of the present invention.

Referring to the drawings, a detailed description will be given hereinbelow of a magnetic pattern forming apparatus and method for use in a magnetic recording apparatus (magnetic disk).

In the present invention, in a case in which a magnetic pattern is form on a magnetic disk through the use of a combination of local heating and exposure to an external magnetic field, the magnetic disk is scanned with a small spot-like energy beam to be heated to form a magnetic pattern; therefore, efficient formation of a magnetic pattern becomes feasible in a small amount of time with even a small-sized and low-priced projection optical system. In addition, it is possible to provide a minute or microscopic magnetic pattern with high accuracy by means of reduction projection.

(First Embodiment)

Referring to FIGS. 1 to 5, a description will be given herein below of a magnetic pattern forming apparatus and method according to a first embodiment of the present invention.

Secondly, a description will be given of a magnetic disk on which a magnetic pattern is formed through the use of a magnetic pattern apparatus (method) according to this embodiment.

According to this embodiment, a magnetic disk is made as follows. That is, usually, a hard substrate is used as a substrate for a magnetic disk, for that there is a need to prevent it from vibrating even when a high-speed rotation takes place at fast recording/reproduction. To provide a sufficient rigidity against the vibration, in general, it is preferable that the thickness of the substrate is equal to or more than 0.3 mm. However, since a high thickness adversely affects the thickness reduction of a magnetic recording apparatus, preferably, it is less than or equal to 3 mm. For example, among the substrates, there are an Al-alloy substrate made of an Al—Mg alloy or the like containing Al as a main component, an Mg-alloy substrate made of an Mg—Zn alloy or the like containing Mg as a main component, a substrate made of any one of common soda glass, aluminosilicate glass, amorphous glass, silicon, titanium, ceramics and various kinds of resins, or a substrate made of a combination thereof. Of these substrates, it is preferable to use the Al-alloy substrate, a glass-made substrate such as a crystallized glass in view of strength, or a resin-made substrate in terms of cost.

In the magnetic pattern forming apparatus (method) according to this embodiment, since a mask and a magnetic disk are placed in a non-contact condition as will be described later, unlike the conventional magnetic printing method, it is free from a problem that the contact between a magnetic disk having a hard substrate and a master disk becomes sufficient to cause flaws or defects, or that the boundary of a magnetic domain printed becomes unclear to enlarge PW50. For this reason, great effects are attainable if the magnetic pattern forming apparatus (method) according to this embodiment is applied to a magnetic disk with a hard substrate. In particular, it is effective to a magnetic disk having a substrate, easy to crack, such as a glass-made substrate.

As magnetic disks to which this magnetic pattern forming apparatus (method) is applicable, disc-like magnetic recording media having a magnetic layer on a substrate are acceptable, for example, including a hard disk, magneto optical disk and others. Incidentally, the magnetic pattern forming apparatus is equally referred to as a "thermomagnetic printing imaging exposure apparatus" or "hard disk printing apparatus".

In a magnetic disk manufacturing process, it is a common way to clean and dry a substrate initially, and also in the present invention, it is preferable to clean and dry a substrate before formation of layers from the viewpoint of securing the adhesion between the layers.

For manufacturing a magnetic disk according to this embodiment, it is also possible to form a metal layer, such as NiP, on a surface of a substrate.

As methods for the formation of the metal layer, thin film formation methods such as electroless plating, sputtering, vacuum deposition and CVD are available. A substrate made of a conductive material permits the use of electrolytic plating. It is preferable that the film thickness of the metal layer is 50 nm or more. However, considering the productivity of the magnetic disk or the like, preferably less than or equal to 500 nm, more preferably less than or equal to 300 nm.

In addition, although it is desirable that the area for the formation of the metal layer is the entire surface of the substrate, only a part thereof, for example, only an area undergoing texturing, is also acceptable.

Still additionally, a concentric texturing can also be made on a surface of a substrate or a surface of a metal layer formed on the substrate. In this embodiment, the concentric texturing signifies, for example, that a large number of microscopic grooves are made on a substrate in its circumferential direction by polishing it in the circumferential direction by means of a mechanical texturing using free abrasive grains and a texture tape, texturing processing using a laser beam or the like or a combination thereof.

As the free abrasive grains, it is preferable to use diamond abrasive grains, more preferably the diamond abrasive grains whose surfaces are graphitized. Although, as another abrasive grains for the mechanical texturing, alumina abrasive grains have come into widespread use, particularly considering a longitudinal orientation medium in which the axis of easy magnetization is oriented along the textured grooves, the diamond abrasive grains show an extremely high performance.

A head flying quantity set to be as small as possible contributes to effective realization of high-density magnetic recording and one of the features of these substrates is superior surface smoothness; therefore, it is preferable that the roughness Ra of the substrate surface is less than or equal to 2 nm, more preferably less than or equal to 1 nm. In particular, it is preferable that it is less than or equal to 0.5 nm. Incidentally, the substrate surface roughness Ra is a value calculated according to JIS B0601 after measured in terms of a measurement length of 400 $\mu$m through the use of a stylus surface roughness measuring apparatus. In this case, the tip portion of the measurement stylus used usually has a size of approximately 0.2 $\mu$m.

It is also appropriate that an under layer is formed on a substrate and between the substrate and a magnetic layer. The under layer is for the purpose of fining the crystal to control the orientation of the crystal surfaces, and an under layer using Cr as a main component is used preferably.

In addition to pure Cr, the materials for the under layer includes Cr oxide and an alloy in which one or two elements selected from V, Ti, Mo, Zr, Hf, Ta, W, Ge, Nb, Si, Cu and B are introduced into Cr for crystal matching with a recording layer (magnetic layer).

Of these, pure Cr or an alloy made by introducing one or two elements selected from Ti, Mo, W, V, Ta, Si, Nb, Zr and Hf into Cr is preferable. Although the optimum contents of these second and third elements vary according to element, it is preferable that the content is 1 atomic % to 50 atomic %, more preferably 5 atomic % to 30 atomic %, and much more preferably 5 atomic % to 20 atomic %.

Although the film thickness of the under layer is not limited as long as it displays an anisotropy, it is preferably 0.1 to 50 nm, more preferably 0.3 to 30 nm, and much more preferably 0.5 to 10 nm. During the film formation for the under layer containing Cr as a main component, limitation is not imposed on whether or not the substrate heating is conducted.

A soft magnetic layer can be placed on the under layer, that is, between the under layer and a magnetic layer as needed. In particular, it is greatly effective and useful to keeper media having less magnetic transition noise or perpendicular magnetic recording media in which a magnetic domain lies in a direction perpendicular to the longitudinal (in-plane) direction of the media.

Preferably, the soft magnetic layer has a relatively high permeability and less loss, and NiFe or an alloy made by introducing Mo or the like as the third element thereinto is properly used. The optimum permeability also varies largely according to the property of a recording layer or a head to be used for recording of data, and generally, it is preferable that the maximum permeability is approximately 10 to 1000000 (H/m).

Alternatively, it is also appropriate that another intermediate layer is placed on the under layer containing Cr as a main component as needed. For example, the additional installation of a CoCr-based intermediate layer is preferable for the orientation control of the magnetic layer.

Following this, at the formation of a recording layer (magnetic layer), a layer made of a material identical to that of the under layer or a layer made of a different non-magnetic material can also be inserted between the recording layer and the soft magnetic layer. At the film formation for the recording layer, limitation is not imposed on whether or not the substrate is heated.

As a recording layer, it is preferable to use a Co-alloy magnetic layer, a rare earth based magnetic layer represented by TbFeCo, a superposed film comprising a transition metal and a noble metal represented by a superposed film comprising Co and Pd, and others.

As the Co-alloy magnetic layer, it is possible to use pure Co or a Co-alloy magnetic material such as CoNi, CoSm, CoCrTa, CoNiCr or CoCrPt commonly used as a magnetic material. Moreover, it is also possible to use a material made by additionally introducing an element such as Ni, Cr, Pt, Ta, W or B, or a compound such as $SiO_2$, into one of these Co-alloys. For example, there are CoCrPtTa, CoCrPtB, CoNiPt, CoNiCrPtB and others. Although the film thickness of the Co-alloy magnetic layer can be determined arbitrarily, it is preferable that the thickness is equal to or more than 5 nm, more preferably, equal to or more than 10 nm. Moreover, it is preferable that it is less than or equal to 50 nm, more preferably, less than or equal to 30 nm. In addition, this magnetic layer can also be made in a manner that two layers or more are placed in a superposed condition directly or in a state where an appropriate non-magnetic intermediate layer is interposed therebetween. In this case, the compositions of the superposed magnetic materials can be the same or different from each other.

For the rare earth-based magnetic layer, general materials can be used as a magnetic material, for example, including TbFeCo, GdFeCo, DyFeCo, TbFe and others. It is also possible that Tb, Dy, Ho or the like is introduced into each of these rare earth alloys. The introduction of Ti, Al or Pt for the purpose of the prevention of oxidative deterioration is also acceptable. Although the film thickness of the rare earth-based magnetic layer can be determined arbitrarily, in general it is approximately 5 to 100 nm. Moreover, this magnetic layer can also be made in a manner that two layers or more are placed in a superposed condition directly or in a state where an appropriate non-magnetic intermediate layer is interposed therebetween. In this case, the compositions of the superposed magnetic materials can be the same or different from each other. In particular, the rare earth-based magnetic layer is an amorphous structural film, and because of having a magnetic domain in a direction perpendicular to the longitudinal direction of the media, it is suitable for high-density recording, and is more effectively applicable to the method according to the present invention capable of forming a magnetic pattern at a high density with high accuracy.

For the superposed film comprising a transition metal and a noble metal which similarly enables the perpendicular magnetic recording, general materials can be used as a magnetic material, for example, including Co/Pd, Co/Pt, Fe/Pt, Fe/Au, Fe/Ag and others. The transition metal and the noble metal, forming the superposed film materials, are not particularly required to be pure, and alloys containing them as main components are also acceptable. Although the thickness of the superposed film can be determined arbitrarily, in general it is approximately 5 to 1000 nm. Moreover, it is also possible that the superposed film is made by superposing three or more kinds of materials, as needed.

In this embodiment, the magnetic layer serving as a recording layer is maintained in a magnetized condition at a room temperature, and is erased when heated and magnetized when being exposed to an external magnetic field concurrently with being heated.

The corecivity of the magnetic layer at the room temperature is required to be set so that the magnetized condition is kept at the room temperature while uniform magnetization is made by a proper external magnetic field. When the corecivity of the magnetic layer at the room temperature is set at 2000 Oe or more, a small magnetic domain can be held, thus providing a magnetic disk suitable for high-density recording. More preferably, it is 3000 Oe or more.

Although the conventional magnetic printing method encounters a difficulty in printing onto a magnetic disk with a considerably high corecivity, in this embodiment, since the magnetic layer is heated to lower the corecivity satisfactorily before the formation of a magnetic pattern, the application to a medium with a high corecivity is preferable.

Meanwhile, it is preferable that the corecivity thereof is set at 20000 Oe and below. If exceeding 20000 Oe, a large external magnetic field is required for batch magnetization, and the ordinary magnetic recording can be difficult.

The magnetic layer is required to maintain a magnetized condition at a room temperature and to be magnetized by a weak external magnetic field at an appropriate heating temperature. Moreover, a magnetic domain of a magnetic pattern tends to be formed more clearly as the difference between the room temperature and a temperature (demagnetization or erase temperature) at which the magnetized condition disappears becomes larger. For this reason, a higher demagnetization temperature is preferable, that is, preferably equal to or more than 100° C., and more preferably equal to or more than 150° C. For example, the demagnetization temperature is set to be in the vicinity of a Curie temperature (slightly lower than the Curie temperature) or around a compensation temperature.

Preferably, the Curie temperature is equal to or more than 100° C. In the case of less than 100° C., the stability of the magnetic domain at the room temperature tends to be low. More preferably, it is equal to or more than 150° C., and less than or equal to 700° C. If the magnetic layer is heated up to an excessively high temperature, the magnetic layer can deform.

In a case in which the magnetic disk is a longitudinal magnetic recording medium, with respect to a high-density magnetic disk with a high corecivity, the conventional magnetic printing method encounters difficulty in saturation recording and difficulty in formation of a magnetic pattern with a high magnetic field strength, and enlarges the full width at half maximum. According to this embodiment, even a longitudinal recording medium suitable for such high recording density can form an excellent magnetic pattern. In particular, if the saturation magnetic field of the aforesaid magnetic layer is equal to or more than 50 emu/cc, the influence of the demagnetizing field becomes great, and hence, the employment of the present invention provides great effects.

Greater effects are attainable if the saturation magnetic field thereof is equal to or more than 100 emu/cc. However, if excessively high, the formation of a magnetic pattern becomes difficult. Therefore, preferably, it is less than or equal to 500 emu/cc.

In a case in which not only the magnetic disk is a perpendicular magnetic recording medium but also a magnetic pattern is relatively large and even a unit volume of one magnetic domain is large, the saturation magnetic field increases and the reverse magnetization tends to occur due to a magnetic demagnetization, thereby producing noises and impairing the full width at half maximum. However, according to this embodiment, the additional use of the under layer made of a soft magnetic material enables satisfactory recording on these magnetic disks.

In this embodiment, it is preferable that a protective layer is formed on a magnetic layer. That is, the uppermost surface of a magnetic disk is covered with a hard protective layer. The protective layer has a function to prevent the magnetic layer from being damaged due to the collision with a head or the insertion of dust/dirt particles between the magnetic layer and a mask. In the case of the employment of a control magnetic pattern forming method using a mask as well as the present invention, it additionally has a function to protect the magnetic disk from the contact with the mask. In a case in which the magnetic layer is made up of a plurality of layers, the protective layer may be placed on a magnetic layer close to the uppermost surface of the magnetic disk. The protective layer can be placed directly on the magnetic layer and, as needed, it can also be placed thereon in a state where a layer having a different function is interposed therebetween.

As the protective layer, any layer is also acceptable as long as it is of a hard type resistant to oxidation. In general, for the protective layer, there is used a carbonaceous material such as carbon, carbon hydride, carbon nitride, amorphous carbon or SiC, or $SiO_2$, $Zr_2O_3$, SiN or TiN. It is also acceptable that the protective layer is made of a material having magnetism.

In the magnetic disk, in order to bring the head and the magnetic layer closest to each other, it is preferable that an extremely hard protective layer is made thin. Accordingly, a carbonaceous protective layer is preferable in view of shock resistance and lubricity, and particularly, a diamond-like carbon is preferable. It has not only a function to prevent the magnetic layer from being damaged by an energy beam but also an extremely strong resistance to damages of the magnetic layer due to a head. The magnetic pattern forming method according to the present invention is also applicable to an opaque protective layer such as a carbonaceous protective layer.

A portion of an energy beam is absorbed by even the protective layer, and is operative to heat the magnetic layer locally due to heat conduction. For this reason, if the thickness of the protective layer is excessively large, the control magnetic pattern can be dim due to transverse heat conduction, and therefore, it is preferable that the film thickness is made thin. Moreover, the thin film is preferable in terms of a reduction of the distance between the magnetic layer and the head at recording/reproduction. Accordingly, the film thickness is preferable to be less than or equal to 50 nm, more preferably less than or equal to 30 nm, and much more preferably 20 nm. However, for sufficient durability, it is preferable that the film thickness is equal to or more than 0.1 nm, more preferably 1 nm or above.

In addition, it is also possible that the protective layer is made up of two or more layers. If a layer containing Cr as a main component is placed as one protective layer just above the magnetic layer, a preferred effect is obtainable in that oxygen penetration to the magnetic layer is preventable.

More preferably, a lubricant layer is formed on the protective layer. This lubricant layer has a function to prevent the magnetic disk from being damaged by a mask or a magnetic head. For example, as lubricants for use in the lubricant layer, there are a fluorine-based lubricant, a hydrocarbon-based lubricant and a mixture thereof. They can be applied thereonto in an ordinary way such as dipping or spin coating. A thin lubricant layer is preferable, for avoiding the interference with the formation of a magnetic pattern, and preferably the thickness is less than or equal to 10 nm. To provide a sufficient lubrication performance, it is preferable that the thickness is set to be equal to or more than 1 nm. However, in a case in which an energy beam is applied from above the lubricant layer, re-applying or the like can be made in consideration of damages (decomposition, polymerization) of the lubricant layer, and others.

The magnetic pattern forming method according to this embodiment can be implemented before the formation of the lubricant layer or after it.

In addition, in order to prevent the impairment of the traveling stability of a flying/contact head, it is preferable that the surface roughness Ra of the magnetic disk after the formation of a magnetic pattern is maintained to be less than or equal to 3 nm. The magnetic disk surface roughness Ra is a roughness of a surface of the magnetic disk not including a lubricant layer, and is a value calculated according to JIS B0601 after measured in terms of a measurement length of 400 $\mu$m through the use of a stylus surface roughness measuring apparatus. More preferably, the surface roughness is set to be less than or equal to 1.5 nm.

More desirably, a surface waviness Wa of the magnetic disk after the formation of the magnetic pattern is kept to be less than or equal to 5 nm. The waviness Wa signifies a waviness of a surface of the magnetic disk having no lubricant layer, and is a value obtained according to the Ra calculation after measured in terms of a measurement length of 2 mm through the use of a stylus surface roughness measuring apparatus. More preferably, the waviness Wa is set to be less than or equal to 3 nm.

Meanwhile, a magnetic pattern for the magnetic disk thus constructed is formed on a recording layer. Preferably, after a protective layer or a protective layer and a lubricant layer are formed on the recording layer, the formation of the magnetic pattern is conducted in one of the above-mentioned methods. However, in a case in which there is no need to pay attention to the oxidation of the recording layer, it is possible to form the magnetic pattern immediately after the film formation for the magnetic layer.

Various types of methods can be taken as a method of forming each layer of the magnetic disk, and for example, there are a dc (magnetron) sputtering method, a high-frequency (magnetron) sputtering method, an ECR sputtering method, and a physical deposition method such as a vacuum deposition method.

In addition, as conditions at the film formation, an ultimate vacuum, a substrate heating method and a substrate temperature, a sputtering gas pressure, a bias voltage and others are determined properly according to a property of a magnetic disk to be produced. For example, as is usual in the case of a sputtering film formation, preferably, the ultimate vacuum is set to be less than or equal to $5\times10^{-6}$ Torr, the substrate temperature is set to be in a range from a room temperature to 400° C., the sputtering gas pressure is set to be $1\times10^{-3}$ to $20\times10^{-3}$ Torr, and the bias voltage is set to be 0 to −500 V.

The film formation can be conducted before the formation of an under layer in the case of heating of a substrate. Alternatively, in the case of use of a transparent substrate having a low thermal absorption factor, in order to increase the thermal absorption factor, a seed layer containing Cr as a main component or an under layer having a B2 crystal structure is formed and the substrate is then heated, before the formation of a recording layer and others.

In a case in which the recording layer is an rare earth-based magnetic layer, from the viewpoint of the prevention of the rare earth-based magnetic layer from corrosion/oxidation, it is preferable that the innermost circumferential part or outermost circumferential part of a disk is masked initially and, after the film formation up to a recording layer, the mask is removed at the subsequent protective layer formation so that the recording layer is completely covered with the protective layer, and if the protective layer is made up of two layers, it is preferable that the film formation is conducted in a state where the recording layer and the first protective layer are masked and the mask is removed at the film formation for the second protective layer so that the recording layer is fully covered with the second protective layer.

Meanwhile, in this embodiment, a magnetic pattern is formed as follows on a magnetic disk thus constructed. That is, a magnetic pattern is formed on a magnetic disk having a magnetic layer on a substrate through a process of heating the magnetic layer locally and a process of exposing the magnetic layer to an external magnetic field. In heating the magnetic layer locally by applying an energy beam to a surface of the magnetic disk, the energy beam application is made according to a mask pattern for projecting (imaging) the mask pattern to the magnetic disk surface at a reduction ratio.

In this case, since the formation of a magnetic pattern is conducted with a combination of the local heating and the exposure to an external magnetic field, unlike the conventional technique, there is no need to use a strong external magnetic field. Moreover, since no magnetization takes place even if a magnetic field is brought to strike on other than the heated area, the formation of a magnetic domain can be limited to a heated area. Thus, the magnetic domain boundary becomes clear, and it is possible to form a pattern in which the magnetic transition width is small and the magnetic transition at the magnetic domain boundary is very sharp, thereby providing a high-quality output signal. Depending upon selection of condition, the magnetic transition width can be set to be less than or equal to 1 $\mu$m.

In addition, since, unlike the conventional technique, there is no need to press a magnetic disk and a master disk, it is possible to eliminate the possibility of the magnetic disk or the mask being damaged and the defects of the magnetic disk being increased.

Still additionally, this technique according to the present invention enables satisfactory formation of a magnetic pattern extending obliquely with respect to a track.

Moreover, since an energy beam is used for the local heating, it is possible to easily control the size of a portion to be heated and the power thereof, thus resulting in high-accuracy formation of a magnetic pattern.

Still moreover, in this embodiment, since a patterning energy beam having an intensity distribution corresponding to a magnetic pattern to be formed is projected (imaged) to a surface of a magnetic disk in a state reduced, in a case in which the energy beam is narrowed down or focused through an objective lens before passing through a mask, that is, as compared with the proximity exposure, limitation is not imposed on the magnetic pattern accuracy due to the mask patterning accuracy or alignment accuracy, and high-accuracy formation of finer magnetic pattern becomes feasible. And not only that, since the mask and the magnetic disk are separated from each other, the formation thereof is less susceptible to dirt particles on the magnetic disk.

An energy beam emitted from a light source is varied in intensity distribution by means of a mask and then reaches a surface of the magnetic disk as an image through an imaging means such as an imaging lens. Incidentally, the imaging leans is sometimes referred to equally as a projection lens, and the reduction imaging is sometimes referred to equally as reduction projection.

As the mask, any thing is also acceptable if it produces the strength and weakness (variable intensity) of an energy beam on a magnetic disk according to a magnetic pattern to be formed. For example, there are a photomask in which an energy beam transmissive part and an energy beam non-transmissive part are made according to a pattern and a hologram mask in which a hologram is recorded so that a specific pattern is imaged on a magnetic disk.

In this technique, an imaging means is situated between a mask and a magnetic disk. When an energy beam is applied in a state where a photomask and a magnetic disk are brought closely into contact with each other, depending upon material, the mask absorbs the energy beam so that it is heated and the temperature of the contacting surface of the magnetic disk rises, thereby sometimes making it difficult to draw a magnetic pattern clearly. On the other hand, the present invention can solve this problem.

That is, for the benefits of the magnetic disk surface on which a magnetic pattern is formed, it is preferable that a large difference is made in temperature between illumination and non-illumination by a pulse-like energy beam, for that the contrast of the pattern is improved or the recording density is enhanced. This means that it is preferable to keep the magnetic disk surface at a temperature somewhat lower than the room temperature at the time of the non-illumination by the pulse-like energy beam. The room temperature is approximately 25° C.

The use of a mask enables easy formation of a complicated magnetic pattern for a short time by simply applying an energy beam. Moreover, it enables easy formation of even a special pattern hard to record through the use of a magnetic head.

For example, a magnetic pattern extending obliquely and linearly with respect to a radius or track is used for a phase shift servo system for a magnetic disk. Such radially continuous pattern or an oblique pattern with respect to the radius was hard to produce through the use of a conventional servo pattern forming method of recording a servo signal for each track while rotating a disk. On the other hand, the present invention allows such a magnetic pattern to be easily and briefly formed with single illumination without requiring complex calculation or complicated apparatus configuration.

As the mask, it is preferable to use a mask having a transmissive part which allows an energy beam to pass partially, so-called a photomask. Since the photomask is easy to produce and easily provides high processing accuracy, it becomes a high-accuracy mask and enables the formation of a high-accuracy magnetic pattern.

If a condenser lens is placed before the mask, an intensity distribution of an energy beam is uniformly obtainable and efficient focusing of an energy beam on an imaging leans becomes feasible, so it is preferable to use the condenser lens.

Although this technique is applicable to a magnetic pattern with any size and shape compatible with the beam diameter of the energy beam and the strength of the external magnetic field, as the magnetic pattern becomes finer, higher effects are attainable. When the minimum width of the magnetic pattern becomes less than or equal to 2 $\mu$m, severer difficulty is experienced in alignment between the magnetic disk and the mask; therefore, the application of this technique produces a large. More preferably, the magnetic pattern minimum width is set to be less than or equal to 1 $\mu$m. No lower limit exists in possible pattern formation, but logically, it is possible to form a minute magnetic pattern near the limit on the wavelength of the energy beam. For example, the use of an eximer laser or the like enables approximately hundred nm.

The minimum width of a pattern signifies a length of the narrowest portion of a pattern to be formed. For example, if the pattern shape is a rectangular configuration, it signifies a length of the shorter side thereof, and if being an ellipse, it signifies the smaller diameter thereof.

In addition, since this technique enables the formation of a finer magnetic pattern through reduction imaging, if it is applied to a servo pattern for positional control of a data recording/reproduction head or the formation of a standard pattern for the recording of the servo pattern, great effects are obtainable. The servo pattern is used to generate a servo signal for conducting the tracking of a recording/reproduction head with respect to a data track on a magnetic disk.

The servo pattern is required to be formed with higher accuracy than that of a data pattern. The poor servo pattern accuracy produces rough head position control. For this reason, logically, it is impossible to record a data pattern with higher accuracy than that of the servo pattern. Accordingly, as the recording density of a magnetic disk increases, a minute servo pattern is formed with higher accuracy.

Since this technique is suitable for the formation of repeated simple magnetic patterns because of using a mask and can form a fine magnetic pattern with high accuracy by means of reduction imaging, if it is used for the production of a servo pattern, a great effect is obtainable. Add to it that the use of a mask enables easy formation of even a special or complex servo pattern.

Even if it is applied to, instead of the servo pattern itself, the formation of a standard pattern for generation of a reference signal which is used for when a drive or the like records a servo pattern, a great effect is similarly obtainable.

Since a high-precision servo pattern or standard pattern is attainable, for a great effect, it can be applied to a high-density recording magnetic disk whose track density is equal to or more than 40 kTPI.

Moreover, also in a case in which the magnetic pattern includes a pattern extending obliquely with respect to a track as mentioned above, since the present invention can provide a large signal strength, the invention is particularly suitable for an oblique pattern such as a phase servo signal.

For example, when a standard line extends in a direction orthogonal to a head traveling direction, the pattern extending obliquely is a pattern having an inclination with respect to the standard line. Preferably, if the inclination with respect to the standard line is within ±45°, a satisfactory signal can be derived even if it is used as a servo signal. Alternatively, a magnetic pattern formed according to this technique can be used for the examination of defects of a magnetic disk. Since the recording process for the defect examination is omissible, it is possible to shorten the manufacturing time, which contributes to cost reduction and the enhancement of accuracy of the defect examination.

Since this technique perform the reduction imaging through the use of an imaging means situated after a mask, if the reduction ratio is set to be large, a more minute pattern becomes formable. However, since the beam diameter of the energy beam becomes smaller due to being narrowed down, the pattern area formable at a time becomes small.

For this reason, this technique would particularly be suitable for a magnetic disk having a diameter less than or equal to 65 mm.

In general, as the diameter of a magnetic disk becomes smaller, a larger recording capacity is required irrespective of a small recording area, and the recording density is extremely high. For use, a magnetic disk whose diameter is less than or equal to 1.8 inches is more preferable, and a magnetic disk having a diameter less than or equal to 1 inch is particularly preferable.

For example, data or the like can be recorded on a disk having as an extremely small diameter as less than or equal to 1 inch. In particular, in the case of a perpendicular magnetic disk, since the entire disk is easily exposed to an external magnetic field, it is possible to record data on the entire surface thereof for a short time. However, this technique is also applicable to a magnetic disk having as a large diameter as 3.5 inches.

In this embodiment, although various combinations of the local heating and the exposure to an external magnetic field can be considered, it is preferable that, after a magnetic layer is previously exposed to an external magnetic field to be uniformly magnetized in a desired direction, concurrently with being heated locally, the magnetic layer is exposed to an external magnetic field so that the heated portion is magnetized in a direction opposite to the desired direction, thereby achieving the formation of a magnetic pattern. Since this can clearly form magnetic domains in opposite directions, it is possible to produce a magnetic pattern providing a high signal strength and excellent C/N and S/N.

As the energy beam, any beam is also acceptable if it can heat a surface of a recording layer locally. However, a laser is preferable in view of the prevention of the application of an energy beam to unnecessary parts.

To make the magnetic transition width sharp or steep, it is preferable to use a pulse-like laser beam which makes a large difference in temperature between energy beam illumination and energy beam non-illumination, and prevents easy occurrence of heat storage.

Although it is also possible to output a continuous laser in the form of pulse through the use of an optical device, the employment of a pulse laser light source is particularly preferable. The pulse laser light source is made to generate a laser intermittently in the form of pulse, and is capable of applying a laser with a high peak power for an extremely short time, and avoiding the occurrence of the heat storage.

In a magnetic disk according to this embodiment, to maintain a magnetized condition to be stable even at the room temperature, it is preferable that the demagnetization temperature at which the magnetized condition (magnetic field) of the magnetic layer disappears is higher. As the difference between the room temperature and the demagnetization temperature is larger, the magnetic domain of a magnetic pattern is more easily formed clearly. For this reason, preferably, the demagnetization temperature is equal to or more than 100° C. For example, the demagnetization temperature exists in the neighborhood of the Curie temperature (somewhat lower than the Curie temperature) or in the vicinity of a compensation temperature.

In addition, preferably, for magnetically detecting a signal through the use of an MR, GMR or TMR head or the like, the saturation magnetic field is equal to or more than 50 emu/cc. In this case, since the influence of the demagnetizing field is great, it is preferable that the pulse width is as narrow as possible so that the temperature of a portion reversely magnetized by heating and an external magnetic field lowers sharply.

More preferably, the saturation magnetic field is set to be equal to or more than 100 emu/cc. However, since the pattern formation becomes difficult when the saturation magnetic field becomes excessively high, it is preferable that the saturation magnetic field is less than or equal to 500 emu/cc.

Still additionally, since a higher corecivity at the room temperature permits high-density recording, preferably, it is equal to or more than 3000 Oe. Although the conventional magnetic printing method encounters a difficulty in printing to a magnetic disk with a too high corecivity, in the present invention, a magnetic layer is heated to sufficiently lower the corecivity before the formation of a magnetic pattern; therefore, a great effect is obtainable when the invention is applied to a disk with a high corecivity.

Moreover, in order to prevent a magnetic disk from being damaged due to collision with a magnetic head in a magnetic pattern formation process and at recording/reproduction, it is preferable to form a protective layer. For shortening the distance between a magnetic layer and a head, it is preferable that the film thickness thereof is less than or equal to 50 nm.

If the magnetic layer is made up of a plurality of layers, the protective layer is placed on a magnetic layer closest to the surface. Preferably, the protective layer is made of a diamond-like carbon. This not only has a function to prevent the magnetic layer from being damaged by an energy beam but also shows an extremely strong resistance to damage of the magnetic layer by the head.

Still moreover, it is preferable that a lubricant layer is provided to give a lubricity between the head and the magnetic disk. Although the magnetic pattern forming method according to the present invention permits the magnetic pattern formation before and after the formation of the lubricant layer, the thickness of the lubricant layer is preferably made thin for the prevention of the interference with the formation of the magnetic pattern or of the sticking of the magnetic head. The preferred thickness thereof is less than or equal to 10 nm.

Furthermore, to maintain the traveling stability of a flying/contact head, it is preferable that the surface roughness Ra of the magnetic disk after the formation of a magnetic pattern is kept to be less than or equal to 3 nm. Incidentally, the magnetic disk surface roughness Ra signifies a roughness of a magnetic disk surface not including a lubricant layer and is a value calculated according to JIS B0601 after measured in terms of a measurement length of 400 μm through the use of a stylus surface roughness measuring apparatus. The more preferable value is less than or equal to 1.5 nm.

More desirably, a surface waviness Wa of the magnetic disk after the formation of the magnetic pattern is kept to be less than or equal to 5 nm. The waviness Wa signifies a waviness of a surface of the magnetic disk having no lubricant layer, and is a value obtained according to the Ra calculation after measured in terms of a measurement length of 2 mm through the use of a stylus surface roughness measuring apparatus. More preferably, the waviness Wa is set to be less than or equal to 3 nm.

Still furthermore, it is preferable that a glass-made hard substrate is used as a substrate of a magnetic disk, for that less dispersion of heat given by an energy beam due to thermal diffusion takes place, thus enabling efficient use of energy. Add to it that, owing to less thermal diffusion, the magnetic pattern resolution is improvable. The employment of the glass substrate according to the present invention is preferable because of exhibiting a strong resistance to the insertion of dirt particles or the like, and because of no occurrence of cracks in a magnetic disk or no damage of a master stemming from the hardness of the substrate surface.

A magnetic disk on which a magnetic pattern is formed in the above-mentioned manner is not limited in magnetic pattern accuracy resulting from mask patterning accuracy or alignment accuracy, a minute magnetic pattern is formable with high precision. Moreover, it is possible to form a pattern which provides a small magnetic transition width and a very sharp magnetic transition at the boundary of a magnetic domain, thus generating a high-quality output signal.

In addition, the magnetic disk can easily be manufactured in an extremely small amount of time and is not required to come closely into contact with a master disk unlike the conventional technique, less flaws or defects occur.

In particular, as the high-density recording is in progress, not only a servo signal is hard to write but also the servo recording is a main cause of an increase in cost; therefore, great effects are obtainable when the present invention is applied to a high-density recording magnetic disk. The application of the present invention there to becomes more easy because the exposure to a magnetic field is easy in the case of a perpendicular magnetic recording medium.

If this technique is incorporated into a magnetic disk manufacturing line, it is possible to manufacture a magnetic disk having a high-precision magnetic pattern formed for head control, in a small amount of time and at a low cost.

Secondly, referring to FIG. 1, a description will be given hereinbelow of a magnetic pattern forming apparatus according to this embodiment.

This magnetic pattern forming apparatus is an apparatus for forming a desired magnetic pattern on a magnetic disk having a magnetic layer on a substrate, and as shown in FIG. 1, is made up of a disk stage (disk table, disk holding means) 60 for holding a magnetic disk 1 rotatably, a mask (photomask) 12, a mask stage (masktable, mask holding means) 61 for holding the mask 12 rotatably, a magnetic field applying means 62, an illuminating optical system 63 equipped with an energy beam source for emitting an energy beam 11, a projection optical system 64, a disk spindle motor (disk rotating actuator, disk rotating means) 2 for rotationally driving the magnetic disk 1, and a mask spindle motor (mask rotating actuator, mask rotating means) 65 for rotationally driving the mask 12.

The mask 12 is for varying an intensity distribution of the energy beam 11, emitted from the energy beam source, according to a desired magnetic pattern to be formed on the magnetic disk 1. In this case, the mask 12 is made to have all patterns corresponding to desired magnetic patterns to be formed on the magnetic disk 1. This mask 12 is formed to have a pattern obtained by enlarging a magnetic pattern to be formed on the magnetic disk 1 on the basis of a reduction ratio for reduction projection. Accordingly, the pattern to be formed on the mask 12 and the desired magnetic pattern to be formed on the magnetic disk 1 are in similar relation to each other. Although no limitation is imposed on the configuration of the mask 12, the mask 12 is usually formed to have a square or a disc-like configuration like the magnetic disk 1.

The magnetic field applying means (external magnetic field applying means, magnetic field generating device) 62 is for exposing the magnetic disk 1 to an external magnetic field.

In this embodiment, first of all, a magnetic layer is exposed to an external magnetic field to be previously magnetized uniformly and the magnetic disk 1 is then exposed to an external magnetic field in an opposite direction while being heated locally, thereby forming a magnetic pattern thereon. Thus, the magnetic field applying means 62 includes a first magnetic field applying means 4 and a second magnetic field applying means 8. Incidentally, if the process for previously magnetizing the magnetic layer uniformly is conducted before the operations in this apparatus, then the first magnetic field applying means 4 is naturally omissible from this apparatus.

The projection optical system 64 is constructed as a linear cylindrical member capable of leading an energy beam (the optical axis of a laser) linearly. Moreover, this projection optical system 64 is located between the mask 12 and the magnetic disk 1 to illuminate a magnetic layer with an energy beam 11 from the energy beam source through the mask 12 for heating the magnetic layer so that a mask pattern is reduction-projected onto the magnetic disk 1. As FIG. 3 shows, this projection optical system 64 is equipped with an imaging means 15 whereby the energy beam (patterned energy beam) 11, whose intensity distribution is changed by the mask 12, is focused to produce a reduced image on a surface of the magnetic disk 1.

Figure 2A:
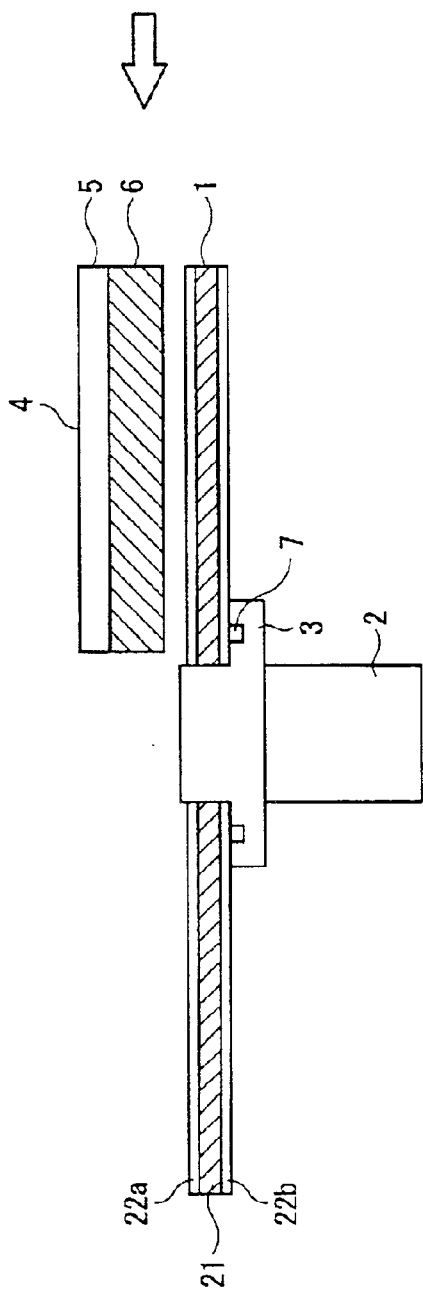
FIG. 2A is a cross-sectional view illustratively showing an example of a disk holding section and magnetic field applying section of the magnetic pattern forming apparatus according to the first embodiment of the present invention.
Figure 2B:
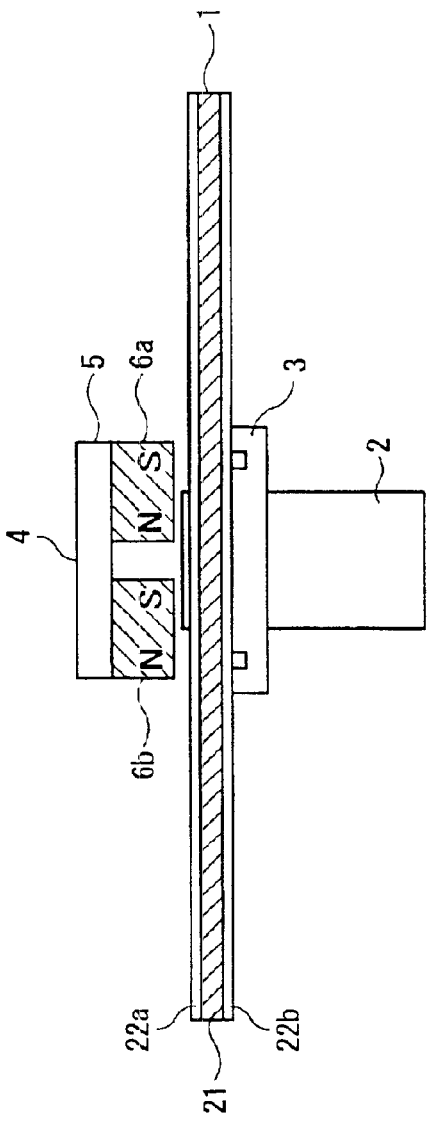
FIG. 2B is an illustrative view showing an example of a disk holding section and magnetic field applying section of the magnetic pattern forming apparatus according to the first embodiment of the present invention.
Figure 3:
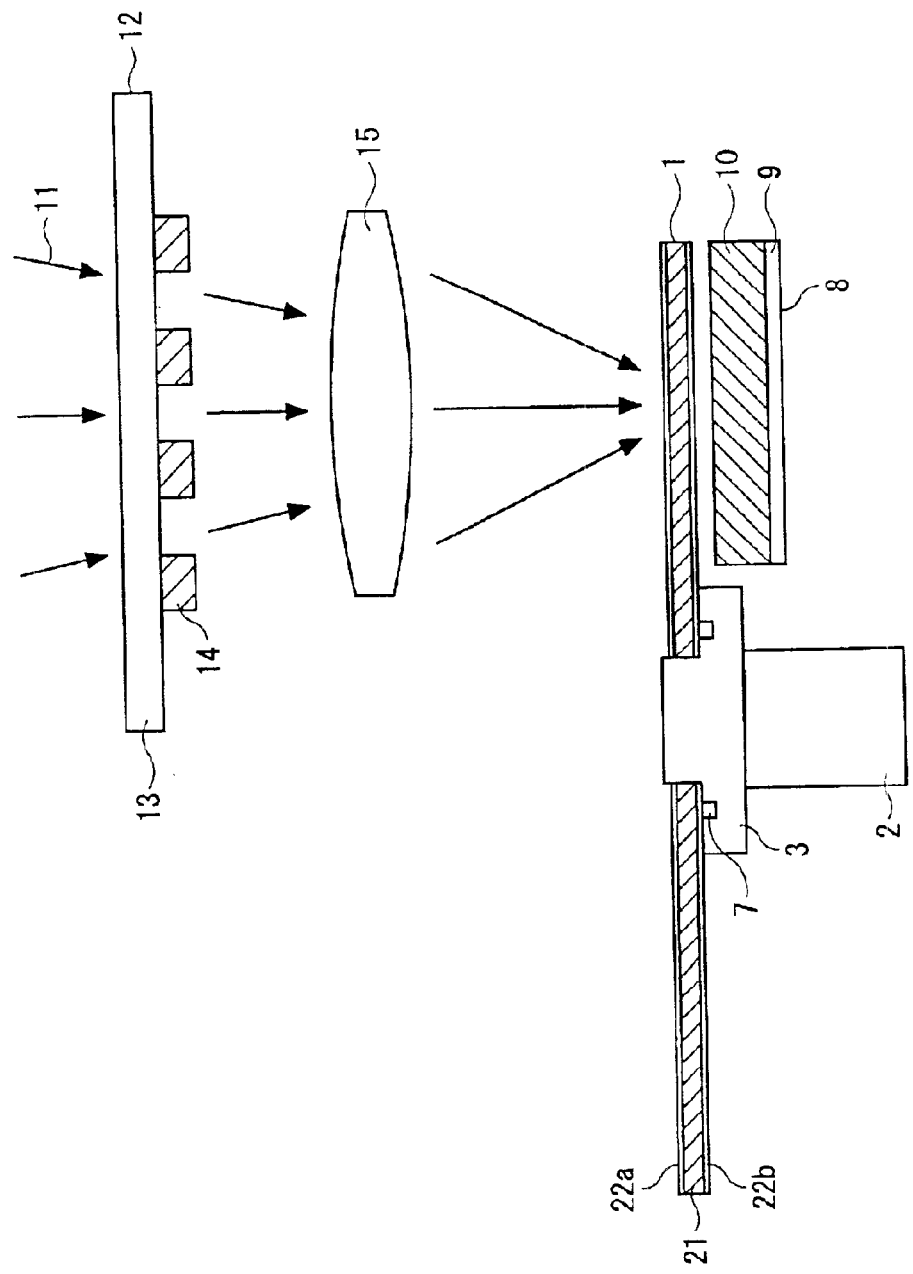
FIG. 3 is a cross-sectional view illustratively showing an example of a disk holding section and magnetic field applying section of the magnetic pattern forming apparatus according to the first embodiment of the present invention.

FIGS. 2A, 2B and 3 are illustrations of an example of a disk stage and magnetic field applying means of a magnetic pattern forming apparatus according to the present invention.

As shown in a cross-sectional view of FIG. 2A, the magnetic disk 1 on which a magnetic pattern is formed is mounted on a turntable 3 fixed coaxially to the disk spindle motor (spindles serving as a rotary shaft to be rotationally driven by a motor are generally referred to as "spindle motors") 2 and then vacuum-adhered thereto through a vacuum trench 7 to be fixedly secured onto the turntable 3. The magnetic disk 1 has magnetic layers 22a and 22b on a hard substrate 21.

The first magnetic field applying means 4 comprising a yoke 5 and a permanent magnet 6 is located above one surface of the disk 1. FIG. 2B is an illustration viewed from a direction of an arrow in FIG. 2A. The first magnetic field applying means 4 has an elongated configuration extending in radial directions of the disk 1, a pair of permanent magnets 6a and 6b, such as NdFe magnets, are fixedly secured onto the yoke 5 in a state where their magnetic poles are placed in opposite directions so that a magnetic field occurs to make connection between the N-pole of the magnet 6a and the S-pole of the magnet 6b. This magnetic field is set to be larger than the corecivity of the disk 1 so that the magnetic layer 22a on the upper surface side of the magnetic disk 1 is magnetized in a longitudinal direction and in a circumferential direction.

In this state, when the spindle motor 2 is rotated in a state where the first magnetic filed applying means 4 is fixed, the magnetic disk 1 is rotated in the arrow direction so that the magnetic layer 22a is exposed to the magnetic field to be magnetized in one direction. Subsequently, the first magnetic field applying means 4 is retreated from above the disk 1.

Following this, the magnetic disk 1 is exposed to an external magnetic field in an opposite direction while being heated locally. As shown in the cross-sectional view of FIG.

3, the second magnetic field applying means 8 comprising a yoke 9 and a permanent magnet 10 is placed above the other surface of the magnetic disk 1. A magnetic field generated from the second magnetic field applying means 8 has the opposite direction to that of the first magnetic field applying means 4, and is weak to be below the corecivity of the disk 1. The other structure can be the same as that of the first magnetic field applying means 4.

A pulse laser beam 11 emitted from a light source (not shown) and passed through a condenser leans arrives at the photomask 12. In the photomask 12, an opaque layer 14 opaque to a laser wavelength is made on a substrate 13 transparent to the laser wavelength on the basis of a magnetic pattern to be formed. Accordingly, after the arrival at the photomask 12, the laser beam 11 penetrates the transparent portions of the photomask 12 so that its intensity distribution varies according to the magnetic pattern, thus producing a spatial pattern.

The photomask 12 can be produced in a manner that a film made of a material opaque to the energy beam, represented by a metal such as Cr, is formed on a substrate such as a quartz glass or a soda-lime glass through the use of, for example, sputtering or the like and a photoresist is applied thereonto and etching or the like is conducted for creating desired transmissive and non-transmissive parts.

When reaching the imaging lens 15, the laser beam 11 is narrowed down to a desired size and the laser shading corresponding to (similar to) the pattern formed on the photomask 12 is projected as an image onto the magnetic disk 1 in a state reduced. The image portion is heated so that the temperature of the magnetic layer 22a is increased to a value in the vicinity of the demagnetization temperature. At this time, an external magnetic field lower than the corecivity of the magnetic layer 22a of the magnetic disk 1 is simultaneously applied thereto by means of the second external magnetic field applying means 8; in consequence, only the temperature-increased portion thereof is magnetized in the direction of the external magnetic field. Following this, the laser illumination is stopped so that the temperature-increased portion is cooled to the room temperature so that the magnetized condition becomes stable. The second external magnetic field has an opposite direction to that of the first external magnetic field which has previously conducted the uniform magnetization, and a magnetic pattern is formed on the magnetic layer 22a.

Incidentally, although one imaging lens 15 is used here as shown in FIG. 3, it is also appropriate to use a plurality of lenses for the improvement of aberration or the like.

The minimum beam diameter φ to which the beam is narrowed down by the imaging lens 15 depends upon the numerical aperture NA of an imaging lens and the wavelength λ of an energy beam being used, and there is a relationship of $\phi=1.22\times(\lambda/NA)$. That is, in a case in which a finer pattern is formed on a magnetic disk, the wavelength λ is determined to be a smaller value or the numeral aperture NA is set at a larger value. In a case in which the beam is previously narrowed down through the use of a condenser lens, there is a need to pay attention to the NA of the condenser lens.

Figure 4:
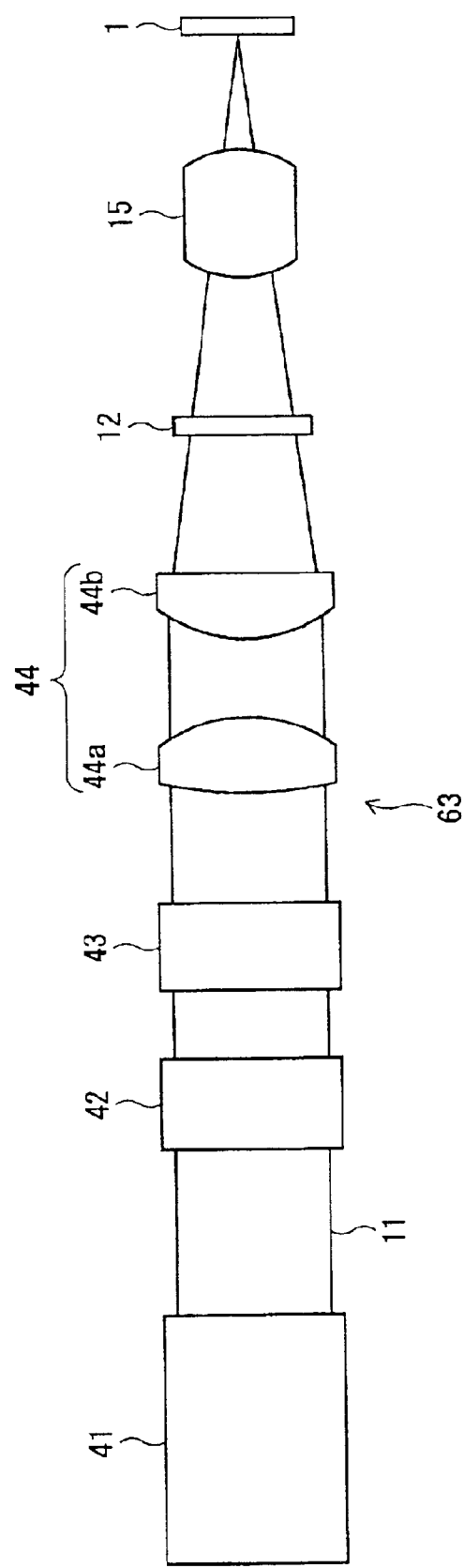
FIG. 4 is an illustration useful for explaining an example of an energy beam illuminating optical system according to the first embodiment of the present invention.

FIG. 4 is an illustration of an example of a construction of the illuminating optical system 63 used for the laser illumination in this embodiment.

As FIG. 4 shows, the pulse laser beam 11 generated from a pulse laser source 41 passes through a programmable shutter 42. The programmable shutter 42 has a function to derive only a desired pulse from the laser source 41. As the pulse laser source 41, it is possible to use an eximer laser or a YAG quadruple-wavelength Q-switch laser.

As will be described later, in this embodiment, since the energy beam (laser beam) is applied in a spot-like configuration, in the case of use of a laser with a high power and a wide illumination range, the illuminating laser light is shaped into a spot-like laser beam through the use of, for example, a shading plate. In this case, the shading plate exhibits a function to avoid the laser illumination toward an unnecessary area or re-illumination toward an area in which a magnetic pattern has already been formed. Preferably, the shading plate is positioned immediately before the mask 12.

The laser beam 11 selected by the programmable shutter 42 is converted into desired power by means of an attenuator 43 and then passed through a condenser lens 44 to reach a photomask 12. In general, the condenser lens 44 is composed of an aspherical lens 44a and a plano-convex lens 44b, and has a function to make uniform the energy intensity distribution at a mask surface and efficiently leads an energy flux to the imaging lens 15.

Then, the laser beam 11, after its intensity distribution is varied according to the magnetic pattern by means of the photomask 12, passes through the imaging lens 15 so that an image is produced on the magnetic layer 22a of the disk 1 in a state reduced.

Figure 5:
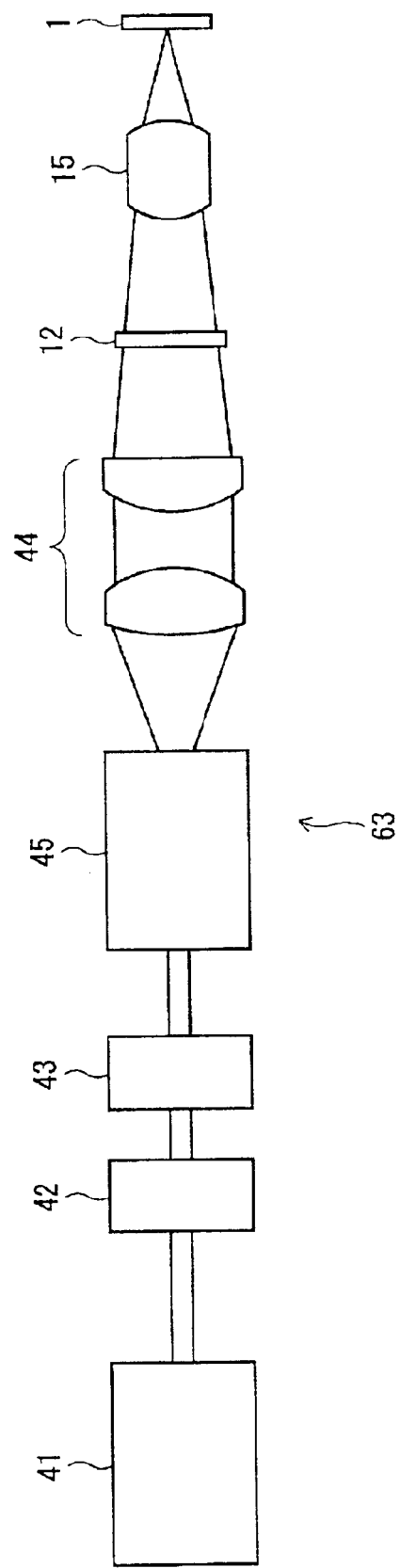
FIG. 5 is an illustration useful for explaining another example of an energy beam illuminating optical system according to the first embodiment of the present invention.

FIG. 5 is an illustration of another example of a construction of the illuminating optical system 63 used for the laser illumination in this embodiment.

As FIG. 5 shows, after passing through the programmable shutter 42 and the attenuator 43, the pulse laser beam 11 generated from the pulse laser source 41 reaches a beam expander 45. The beam expander 45 is put to use in a case in which the beam diameter is once enlarged before imaging, for example, when the reduction projection ratio of a mask is enhanced.

Following this, the laser beam 11 passes through the condenser lens 44, and its intensity distribution is varied according to the magnetic pattern in the photomask 12. Then, the laser beam 11 is converted through the imaging lens 15 into a reduced image on the magnetic layer 22a of the disk 1.

For making the energy intensity distribution uniform, a homogenizer can also be use in place of the condenser lens. Moreover, it is also possible to use both the condenser lens and homogenizer.

Alternatively, in the case of no use of these uniforming means, it is also possible to use only a desirable-distribution portion while intercepting a low-energy portion by means of a slit or the like.

Incidentally, the configuration and component disposition of the optical system to be used in this embodiment can be changed diversely as needed.

Although, for applying an external magnetic, the second external magnetic field applying means 8 can be located on any one of both surface sides of a disk, and in the above-described example, because of being placed on a side opposite to the laser illumination surface of the magnetic disk 1, it does not intercept the laser beam.

Furthermore, a description will be given hereinbelow of preferred conditions on the energy beam 11.

As the energy beam 11, any beam is also acceptable if it can heat a recording layer surface partially, but from the viewpoint of avoiding the application of an energy beam to an unnecessary portion, a laser is preferable.

In particular, a pulse laser source is preferably put to use. The pulse laser source is for intermittently generating a laser beam in a pulse-like form, and it can emit a laser beam with a high peak power for an extremely short time to cause less heat storage, as compared with a case in which a continuous laser beam is intermitted through the use of an optical device such as an acoustic optical device (AO) or an electric-optical device (EO) to be converted into a pulse-like state, so the pulse laser source is considerably preferable.

In the case of a continuous laser beam being pulsed through an optical device, in the pulse, the substantially same power is gained over its pulse width. On the other hand, the pulse laser source is made to emit a laser beam in the form of a pulse at a time after storing energy by resonance therein, and hence, the peak power becomes extremely high within the pulse and then get smaller. In this embodiment, for the formation of a magnetic pattern with high contrast and high accuracy, it is preferable to rapidly heat a recording layer in an extremely small amount of time, and for this reason, a pulse laser source is preferably put to use.

For the benefits of the magnetic disk surface on which a magnetic pattern is to be formed, it is preferable to increase the difference in temperature between the illumination and non-illumination by a pulse-like energy beam. That is, it improves the pattern contrast and enhances the recording density. Accordingly, preferably, the magnetic disk surface temperature is lower than the room temperature at the time of the non-illumination by the pulse-like energy beam. In this case, the room temperature is approximately 25° C.

Preferably, the wavelength of the energy beam is less than or equal to 1100 nm. If the wavelength thereof is shorter than this value, it is possible to reduce the diffraction effect for improving the resolution, which facilitates the formation of a minute magnetic pattern. More preferably, the wavelength thereof is less than or equal to 600 nm. It is possible to enlarge the spacing, i.e., a gap, between a mask and a magnetic disk owing to not only the high resolution but also the reduced diffraction, thus resulting advantageously in easy handling and easy organization of the magnetic pattern forming apparatus. Moreover, it is preferable that the wavelength thereof is equal to or more than 150 nm. Below 150 nm, the absorption thereof by a synthetic quartz used for a mask increases, thus easily causing insufficient heating. If the wavelength thereof is set to be equal to or more than 350 nm, it is also possible to use an optical glass as a mask.

Concretely, there are an eximer laser (248 nm), and the double-wavelength (532 nm), the triple-wavelength (355 nm) or quadruple-wavelength (266 nm) of a YAG Q-switch laser (1064 nm), and further an Ar laser (488 nm, 514 nm), a ruby laser (694 nm) and others.

Preferably, the power per pulse of the pulse-like energy beam is set to be less than or equal to 1000 $mJ/cm^2$. If power exceeding this value is applied, there is a possibility that the magnetic disk surface is damaged by the pulse-like energy beam to be deformed. If the deformation causes the roughness Ra exceeding 3 nm or the waviness exceeding 5 nm, this can interfere with the traveling of the flying/contact head.

More preferably, it is less than or equal to 500 $mJ/cm^2$, and much more preferably, less than or equal to 100 $mJ/cm^2$. Within this area, even if a substrate with a relatively large thermal diffusion is put to use, it is easy to form a magnetic pattern with a high resolution. Moreover, it is preferable that the power is equal to or more than 10 $mJ/cm^2$. Below this value, the temperature of the magnetic layer is hard to increase and the magnetic printing is hard to conduct.

In a case in which a substrate to be used in this embodiment is made of a metal such as Al or an alloy, the thermal conductivity is high, it is preferable that the power is in a range from 30 to 120 $mJ/cm^2$ for fear of distortion of the magnetic pattern stemming from heat given locally being extended to other than a desired portion or of physical damage to the substrate due to excessively energy.

In a case in which the substrate is made of ceramics such as glass, since it has less heat conduction than that of Al or the like and larger heat storage occurs at the pulse-like energy beam applied portion, it is preferable that the power is in a range from 10 to 100 $mJ/cm^2$.

In a case in which the substrate is made of a resin such as polycarbonate, since the heat storage increases at the pulse-like energy beam applied portion and the melting point thereof is lower as compared with a glass or the like, it is preferable that the power is in a range from 10 to 80 $mJ/cm^2$.

In addition, in the case of being apprehensive of damage of a magnetic layer, protective layer or lubricant layer due to an energy beam, a means can also be taken to enhance the magnetic field strength to be applied concurrently with the pulse-like energy beam. That is, a magnetic field as large as possible, for example, 25 to 75% of the corecivity at the ordinary temperature in the case of a longitudinal magnetic recording medium and 1 to 50% thereof in the case of perpendicular magnetic recording, is applied thereto for the purpose of lowering the illuminating energy.

In the case of impressing the pulse-like energy beam through the protective layer and the lubricant layer, re-applying or the like can be required after the illumination in consideration of damages (decomposition, polymerization) of the lubricant layer, and others.

It is desirable that the pulse width of the energy beam is less than or equal to 1 $\mu$sec. In the case of a pulse width below this value, the heating by the energy given through the pulse-like energy beam to the magnetic disk is dispersed so that the resolution tends to decrease. In a case in which the power per pulse is the same, if the pulse width is shortened to impress strong energy at a time, there is a tendency that the thermal diffusion decreases and the resolution of the magnetic pattern increases. More preferably, the pulse width is less than or equal to 100 nsec. In this area, even if the substrate is made of a metal such as Al having a relatively large thermal diffusion, it is possible to easily form a magnetic pattern with a high resolution. That is, attaching importance to the resolution, a shorter pulse width is more preferable. Moreover, it is preferable that the pulse width is equal to or more than 1 nsec. This is because it is preferable that the heating is maintained until the reverse magnetization of the magnetic layer comes to completion.

As one type of pulse-like laser beam, there is a laser such as a mode lock laser capable of generating an ultra short pulse attaining a picosecond or femtosecond level at a high frequency. During a time period in which the ultra short pulses are applied at a high frequency, although the laser beam disappears for an extremely short time between the ultra short pulses, a heated area cools hardly because of the extremely short time. That is, an area raised once up to a temperature exceeding the Curie temperature is kept at a temperature above the Curie temperature.

Accordingly, in such a case, a continuous illumination time (continuous illumination time including a time between the ultra short pulses for which the laser beam disappears) is set as one pulse. Moreover, a value obtained by the integration of an energy illumination quantity for a continuous illumination time is set as power per pulse ($mJ/cm^2$).

A means for exposing a magnetic layer to an external magnetic field can accept the employment of a magnetic head, the use of a plurality of electromagnets or permanent magnets disposed so that a magnetic field appears in a magnetizing direction, or a combination of these different means.

Incidentally, it is preferable that the external magnetic field applying direction is any one of a circumferential direction and radial direction of the magnetic disk 1 and a direction perpendicular to a disk surface.

According to the present invention, a sufficient spacing corresponding to a focal length exists between the imaging means and a magnetic disk, which eliminates a possibility that the magnetic disk is damaged because of dust getting therebetween or damaged due to the contact with other components stemming from the waviness of the magnetic disk. That is, this can solve the problem arising with the conventional printing technique.

Since the distance to the imaging plane is determined in advance, the separation between the imaging plane and the magnetic disk is adjusted to this distance.

Preferably, for the formation of a magnetic pattern, a shading plate capable of intercepting an energy beam partially is placed between the energy beam source and the mask means or between the mask means and the magnetic disk for providing a structure capable of preventing the energy beam from being re-applied thereto.

As the shading plate, any device is also acceptable if it does not permits the transmission of the wavelength of an energy beam being used, or reflects or absorbs the energy beam. However, since the absorption of the heat from the energy beam tends to have influence on a magnetic pattern due to the heat, it is preferable to employ a device or member having a high thermal conductivity and a high reflectivity, for example, a metal plate made of Cr, Al, Fe or the like.

If the substrate of a magnetic disk according to this embodiment is made of a glass, since the dispersion quantity of the heat from the energy beam due to the heat diffusion is small, it is possible to use the energy efficiently, so the employment of this glass substrate is preferable. Add to it that the less heat diffusion can improve the resolution on the magnetic pattern. The employment of the glass substrate according to the present invention provides a strong resistance to insertion of dirt particles and to occurrence of cracks in the magnetic disk or damage of the master stemming from the hard substrate surface.

In addition, in order to prevent the magnetic disk from being damaged in a magnetic pattern forming process, it is preferable that a protective layer with a thickness of 50 nm is placed on the magnetic layer. In a case in which the magnetic layer is made up of a plurality of layers, the protective layer is placed on the magnetic layer close to the uppermost surface of the magnetic disk. More preferably, a lubricant layer whose thickness is less than or equal to 10 nm is placed on the protective layer.

In this embodiment, the following methods can be taken as a combination of a process of heating a magnetic layer locally and a process of exposing the magnetic layer to an external magnetic field.

Mode 1: a method of forming a magnetic pattern by exposing a magnetic layer to a weak external magnetic field simultaneously with heating it so that only the heated portion is magnetized in the direction of the external magnetic field. This enables easy formation of the magnetic pattern and permits the use of the weak external magnetic field.

Mode 2: a method of forming a magnetic pattern by magnetizing a magnetic layer uniformly with a strong external magnetic field in a desired direction before heating it and then heating a desired portion thereof concurrently with exposing the desired portion to a weak magnetic field for magnetizing it in a direction opposite to that before the heating. This provides a magnetic pattern having an enhanced signal strength and an excellent C/N and S/N.

These methods will be described hereinbelow.

The direction of the external magnetic field exposure made concurrently with the heating in the mode 1 varies according to type of a magnetic layer of a magnetic disk. In the case of a magnetic disk in which the axis of easy magnetization lies in a longitudinal direction, the exposure to the external magnetic field is made so that the magnetic layer is magnetized in a direction identical or opposite to the traveling direction (moving direction of the head relative to the magnetic disk) of a data writing/reproducing head. Moreover, the exposure to the external magnetic field can also be made so that the magnetic layer is magnetized in a radial direction of the magnetic disk. In a case in which the axis of easy magnetization lies in directions perpendicular to the longitudinal direction, the exposure to the external magnetic field is made so that the magnetic layer is magnetized in one of the perpendicular directions.

In this case, the strength of the magnetic field, although varying according to property of a magnetic layer of a magnetic disk, is set to be lower than the corecivity at the room temperature. Preferably, the magnetic field is set to be equal to or more than ⅛ of the corecivity of the magnetic layer at the room temperature. Below this value, the heated portion receives the influence of the magnetic field from a peripheral magnetic domain when cooled, and hence there is a possibility that it is again magnetized in the same direction as that of the periphery.

However, it is preferable that the magnetic field strength is set to be less than or equal to ⅔ of the corecivity of the magnetic layer at the room temperature. Above this value, it can exert influence on the magnetic domains around the heated portion. More preferably, the magnetic field strength is set to be less than or equal to ½ of the corecivity thereof.

The heating is made up to a temperature at which the corecivity of the magnetic layer starts to lower, for example, to a value in the vicinity of the Curie temperature of the magnetic layer. Preferably, the heating is made to 100° C. ore more. A magnetic layer, which receives the influence of an external magnetic field below 100° C., tends to have a magnetic domain with low stability at the room temperature. Moreover, it is preferable that the heating temperature is less than or equal to 400° C. If exceeding this temperature, the possibility exists that the magnetic layer deforms.

The direction of the external magnetic field before the heating in the mode 2 varies with the type of a magnetic layer of a magnetic disk. In the case of a magnetic disk in which the axis of easy magnetization lies in a longitudinal direction, the exposure to the external magnetic field is made so that the magnetic layer is magnetized in a direction identical or opposite to the traveling direction (moving direction of the head relative to the magnetic disk) of a data writing/reproducing head. Moreover, in a case in which the magnetic disk has a circular configuration, the exposure thereto can also be made so that the magnetic layer is magnetized in a radial direction of the magnetic disk. In a case in which the axis of easy magnetization lies in directions perpendicular to the longitudinal direction, the exposure thereto is made so that the magnetic layer is magnetized in one of the perpendicular directions.

Although the strength of the magnetic field varies with the property of the magnetic layer of the magnetic disk, it is preferable that the magnetization thereof is made by a magnetic field equal to or more than twice the corecivity of the magnetic layer at the room temperature. Below this value, the possibility exists that the magnetization becomes insufficient. However, in consideration of the ability of a magnetizing device to be used for magnetic filed application, it is preferable that the magnetic field strength is set to be less than or equal to five times the corecivity of the magnetic layer at the room temperature.

The direction of the magnetic field to be applied simultaneously with the heating in the mode 2 is opposite to the magnetic field direction before the heating.

In this case, the magnetic field strength is similar to that of the external magnetic field applied concurrently with the heating in the mode 1, and the heating temperature is the same as that in the mode 1.

By optimizing the above-mentioned conditions, a magnetic pattern is formable with higher accuracy, and the quality of the output signal is improvable. That is, it is possible to form a pattern which provides a small magnetic transition width, extremely sharp magnetic transition at the boundary of a magnetic domain and a high-quality output signal. Depending upon the selection of the conditions, magnetic transition widths less than or equal to not only 1 $\mu$m, but also 0.5 $\mu$m and even 0.3 $\mu$m becomes possible.

In this embodiment, the magnetic transition width signifies a magnetic pulse width (that is, full width at half maximum) corresponding to 50% of the maximum magnetization for a reproduced signal waveform obtained by reproducing a magnetic pattern through the use of a magnetic head.

In addition, the method according to the present invention has an advantage of suppressing the laser beam intensity to a lower value as compared with a conventional method of forming an irregular pattern by means of a laser beam, and can prevent the flying head from being unstable due to the absence of irregularities.

According to this method, since a combination of the local heating by a local heating means and the exposure to an external magnetic field by an external magnetic field applying means is employed for the formation of a magnetic pattern, it is possible to form a magnetic pattern without using a powerful external magnetic field applying means, unlike the conventional technique. Moreover, since no magnetization is made even if a magnetic field is applied to other than the heated area, the formation of a magnetic domain is limited to the heated area. Thus, it is possible to form a pattern which provides a small magnetic transition width, extremely sharp magnetic transition at the boundary of a magnetic domain and a high-quality output signal. Depending upon the selection of the conditions, it is possible to set the magnetic transition width at 1 $\mu$m and below.

According to this technique, unlike the conventional magnetic printing technique, there is no need to press a magnetic disk and a master disk into an integrated condition by means of vacuum adhesion or the like, which eliminates the need for a complicated disk holding means. Moreover, although the conventional technique requires repeated adhesion/removal of a mask at every replacement of a magnetic disk, this technique does not require the removal of a mask after it is once set. Add to it that, since the disk and the mask are positioned in a separated condition, the handling such as attachment/removal of the disk or the mask becomes easy.

In addition, since an energy beam is used for the local heating, it is easy to control a portion to be heated and power.

Still additionally, because of the employment of a reduction projection technique, as compared with the conventional printing apparatus, if the mask alignment accuracy or mask patterning accuracy with respect to a magnetic disk is the same, a more minute magnetic pattern is formable with high accuracy.

Using a mask having a transmissive part allowing partial transmission of an energy beam, so-called a photomask, the pattern formation becomes easy and a high processing accuracy is attainable, which provides a high-precision mask and enables the formation of a higher-accuracy magnetic pattern.

As an energy beam source, any source is also acceptable if it is capable of heating a surface of a recording layer partially, but a laser beam source is preferable from the viewpoint of preventing an unnecessary portion from being exposed to the energy beam.

For making the magnetic transition width sharp, it is preferable to use a pulse-like laser beam which provides a large difference in temperature between the energy beam illumination and the energy beam non-illumination and eliminates easy occurrence of heat storage.

Although it is acceptable to convert a continuous laser beam into a pulse-like form through the use of an optical device, the employment of a pulse laser source is particularly preferable. The pulse laser source is for generating a laser beam intermittently in a pulse-like form, and can emit a laser beam with high peak power for an extremely short time to prevent easy occurrence of heat storage.

When a condenser lens is located before a mask, it is possible to make the intensity distribution of an energy beam uniformly and condense the energy beam toward an imaging leans. Therefore, the location of the condenser lens is preferable.

Meanwhile, requirements exist for shortening the time to be taken for the formation of a magnetic pattern on the magnetic disk 1 to the utmost while maintaining a high resolution for realizing high productivity.

For shortening the magnetic pattern formation time to the utmost, for example, it is considered to apply the energy beam 11 to a wide area (for example, entire surface) of the magnetic disk 1 for forming a magnetic pattern over the wide area of the magnetic disk 1 at a time. However, in this case, there is a need to use a large-sized illuminating optical system 63 (particularly, light source 41) or projection optical system 64, which leads to an increase in cost.

For this reason, a desirable approach is to scan the magnetic disk 1 with an energy beam in a circumferential direction of the magnetic disk 1 while employing a small-sized and low-priced illuminating optical system 63 (particularly, light source 41) or projection optical system 64 [that is, system which can apply an energy beam to only a small area on the magnetic disk 1 (that is, system having a small imaging range)], for realizing efficient formation of a magnetic pattern for as a short time as possible.

In particular, in a case in which the magnetic disk 1 is a longitudinal magnetic recording medium, there is a need to apply a magnetic field in a disk circumferential direction for the formation of a magnetic pattern, but difficulty is encountered in applying the magnetic field to the entire surface of the magnetic disk 1 in the disk circumferential direction at a time. For this reason, for the formation of a magnetic pattern on the entire surface of the magnetic disk 1, an efficient manner is writing a magnetic pattern intermittently on each of small ranges (for example, short arcuate sectors) obtained by dividing the magnetic disk 1 along the disk circumferential direction.

Accordingly, in this embodiment, for the formation of a magnetic pattern on the entire surface of the magnetic disk 1, the magnetic disk 1 is scanned two-dimensionally with a spot-like (small square, ellipse or circle) energy beam (laser beam spot) capable of illuminating a small range on the magnetic disk. This can form a magnetic pattern efficiently in a small amount of time while achieving a small-sized and low-priced illuminating optical system 63 (particularly, light source 41) or the projection optical system 64.

In this case, preferably, the spot size of the spot-like energy beam is approximately 1/10 to 1/10,000 of the radius of the magnetic disk 1. In particular, considering the object of the present invention that a small spot diameter is acceptable, although it is preferable that the spot size (spot diameter) is set to be less than or equal to 1/10 of the radius, since a too small spot size causes a long time to be taken for the pattern formation, preferably, the spot size is equal to or more than 1/10,000.

For example, in the case of a common magnetic disk having a diameter of 2.5 inches or the like, an appropriate spot size (spot diameter) is in a range of approximately 10 μm to approximately 1 mm.

In this case, as the light source 41 of the illuminating optical system 63, a source is employed which is capable of emitting a spot-like laser beam, and in this case, for scanning a wide area for as a short time as possible, it is preferable to use a device capable of an energy beam in the form of a short pulse at a high speed. For example, it is preferable to use a pulse YAG laser based on LD continuous excitation, which shows high stability, high frequency and small energy per pulse. In this case, the laser beam spot has a rectangular configuration and the size thereof is approximately 0.2 mm long by approximately 0.2 mm broad.

In the case of the use of a device such as an eximer laser which provides a relatively high output, irrespective of the illumination range being large, it is possible to heat the magnetic disk 1 up to a temperature at which the magnetization becomes possible (it is possible to sufficiently secure energy per unit illumination area). On the other hand, since a YAG laser can produce only a relatively low output, the illumination with a laser beam with a relatively small illumination area (spot-like configuration) is made to give sufficient energy per unit illumination area in order to secure a heating performance capable of magnetizing the magnetic disk 1.

In this connection, in this embodiment, although various types are available as the light source 41 as mentioned above, in the case of the use of a high-power (high-output) and wide-illumination-range laser such as a eximer laser for generating an energy beam (laser beam) in a spot-like form, a shading plate, for example, can be used so that a laser beam to be applied is shaped into a spot-like laser beam.

In addition, in this embodiment, the scanning with the energy beam 11 is made in radial directions of the magnetic disk 1 and the mask 12 while they are rotated as mentioned above. This is called r-θ direction scanning (radial-circumferential direction scanning).

In this case, the formation of a magnetic pattern on the entire surface of the magnetic disk 1 is effected in a manner that the scanning with an energy beam 11 is linearly (or in an arcuate fashion) made only once from a point near the central portion of the magnetic disk 1 to a point near the outermost circumferential portion (from a point near the outermost circumferential portion to a point near the central portion of the magnetic disk 1) on the magnetic disk 1.

As a manner of scanning the magnetic disk 1 with the energy beam 11 in a radial direction of the magnetic disk 1 while rotating the magnetic disk 1 and the mask 12, there are a method of continuously scanning the magnetic disk 1 with the energy beam 11 from a portion near the central portion to a portion near the outermost circumferential portion (from a portion near the outermost circumferential portion to a portion near the central portion) on the magnetic disk 1 for performing a spiral scanning with the energy beam 11 and a method of stepwise changing the position of the illumination by the energy beam 11 more-than-one times along a radial direction of the magnetic disk 1 for performing concentric scanning with the energy beam 11.

Concretely, for making a scan with an energy beam in a radial direction of a magnetic disk and a mask, in this embodiment, the position of the energy beam illumination made through the illuminating optical system 63 is fixed and the locations of the projection optical system 64 and the magnetic field applying means 62 are fixed, while the disk stage 60 and the mask stage 61 (that is, the magnetic disk 1 and the mask 12) are shifted (for scanning) in a direction orthogonal to (perpendicularly intersecting) the axis of the energy beam 11 (optical axis of a laser beam) applied through the illuminating optical system 63 and the projection optical system 64.

That is, the disk stage 60 and the mask stage 61 are located separately in parallel with each other and the projection optical system 64 is placed between the disk stage 60 and the mask stage 61 to be at right angles to the disk stage 60 and the mask stage 61 so that the exit of the projection optical system 64 is located in opposed relation to the disk stage 60 and the entrance of the projection optical system 64 is situated in opposed relation to the mask stage 61. Moreover, the disk stage 60 and the mask stage 61 are shifted in parallel in a state where the relationship in location among the disk stage 60, the mask stage 61 and the projection optical system 64 remains maintained.

From a method in which the magnetic disk 1 and the mask 12 are scanned with the energy beam 11 in radial directions of the magnetic disk 1 and the mask 12 by shifting the disk stage 60 and the mask stage 61 (that is, the magnetic disk 1 and the mask 12), this is referred to as a "stage scan method (table scan method, disk scan method)".

Accordingly, as FIG. 1 shows, the magnetic pattern forming apparatus according to the present invention is, as mentioned above, made up of the disk spindle motor (disk rotating actuator, disk rotating means) 2 for rotationally driving the disk 1 and the mask spindle motor (mask rotating actuator, mask rotating means) 65 for rotationally driving the mask 12, and further includes a disk stage linear motor 66 for driving the disk stage 60, a mask stage linear motor 67 for driving the mask stage 61 and a controller (control means) 68 for controlling the operations of these disk spindle motor 2, mask spindle motor 65, disk stage linear motor 66 and mask stage linear motor 67.

In this embodiment, the disk spindle motor 2 is held on the disk stage 60 to be movable together with the disk stage 60. In like manner, the mask spindle motor 65 is held on the mask stage 61 to be movable together with the mask stage 61.

Of these components, the disk stage linear motor (disk stage driving actuator, disk holding means driving actuator, disk stage driving means) 66 is connected to the disk stage 60 to move the disk stage 60 relatively with respect to the projection optical system 64 set in a fixed condition.

That is, the disk stage linear motor 66 is designed to operate on the basis of a control signal (operation signal) from the control means 68, and upon an operation of the disk stage linear motor 66, the disk stage 60 is made to be shifted in parallel in the same plane in a direction orthogonal to the energy beam 11 (the optical axis of the laser beam) applied through the projection optical system 64.

Thus, the scanning with the energy beam 11 given through the exit of the projection optical system 64 located in a fixed condition can be made from a point in the vicinity of the central portion to a point in the vicinity of the outermost circumferential portion (or from a point near the outermost circumferential portion to a point near the central portion) on the magnetic disk.

The mask stage linear motor (mask stage driving actuator, mask holding means driving actuator, mask stage driving means) 67 is connected to the mask stage 61 to move the mask stage 61 relatively with respect to the illumination position of the fixed illuminating optical system 63 or the fixed projection optical system 64.

That is, the mask stage linear motor 67 is designed to act on the basis of a control signal (operation signal) from the control means 68, and upon an operation of the mask stage linear motor 67, the mask stage 61 is shifted in parallel in the same plane in a direction orthogonal to the energy beam 11 (the optical axis of the laser beam) given from the illuminating optical system 63 toward the projection optical system 64.

Thus, the scanning with the energy beam 11 applied from the illuminating optical system 63, whose illumination position is fixed, toward the projection optical system 64 can be made from a point in the vicinity of the central portion to a point in the vicinity of the outermost circumferential portion (or from a point near the outermost circumferential portion to a point near the central portion) on the mask 12.

The control means 68 controls the disk spindle motor 2 and the mask spindle motor 65 for turning the magnetic disk 1 and the mask 12 at an equal speed, and outputs a control signal to the disk stage linear motor 66 and the mask stage linear motor 67 for controlling the scanning so that the energy beam 11 to be applied to the magnetic disk 1 and the energy beam 11 to be applied to the mask 12 are in synchronism with each other.

In this case, the control means 68 controls the operation of the disk stage linear motor 66 by outputting a control signal thereto, and at this time, controls the moving quantity, moving speed and others of the disk stage 60.

In like manner, the control means 68 controls the operation of the mask stage linear motor 67 by outputting a control signal thereto, and at this time, controls the moving quantity, moving speed and others of the mask stage 61.

In addition, the control means 68 is made to output the control signals for the disk stage linear motor 66 and the mask stage linear motor 67 in a synchronized condition so that the disk stage 60 and the mask stage 61 are moved in a synchronized condition.

Still additionally, the control means 68 is made to control the moving speeds of the mask stage 61 and the disk stage 60 on the basis of a ratio of the speed (moving speed) at which the mask stage 61 is moved and the speed (moving speed) at which the disk stage 60 is moved, set according to a reduction ratio to be taken for when a mask pattern is projected onto the magnetic disk 1 at a predetermined reduction ratio by illuminating the magnetic disk 1 with the spot-like energy beam 11.

For example, if the predetermined reduction ratio for the reduction projection is set to be ½, the moving speed of the mask stage 61 and the moving speed of the disk stage 60 is set so that the speed ratio thereof is 2:1.

In this way, the mask stage 61 and the disk stage 60 are designed to be movable independently of each other so that the moving speeds thereof are variable in accordance with the predetermined reduction ratio, which can cope particularly with the reduction projection.

Moreover, it is also appropriate that the control means 68 controls the rotational speeds of the magnetic disk 1 and the mask 12 on the basis of a speed ratio of a rotational speed of the magnetic disk 1 and a rotational speed of the mask 12 set according to a predetermined reduction ratio, and controls the moving speeds of the mask stage 61 and the disk stage 60 to speeds equal to each other.

The magnetic pattern forming apparatus according to this embodiment is constructed as described above, and is operated as follows.

That is, in forming a desired magnetic pattern on the magnetic disk 1 by applying the energy beam 11 through the mask 12 to the magnetic disk 1, having the magnetic layer 22a on a substrate, for heating the magnetic layer 22a concurrently with exposing the heated portion of the magnetic layer 22a to an external magnetic field from the magnetic field applying means 62, in a state where the magnetic disk 1 is rotated by the disk spindle motor 2 and the mask 12 is rotated by the mask spindle motor 65 at a speed equal to the rotational speed of the magnetic disk 1, the scanning with the energy beams 11 are made by the disk stage linear motor 66 and the mask stage linear motor 67 in the radial directions of the magnetic disk 1 and the mask 12 in a synchronized condition.

Concretely, the disk stage 60 carrying the magnetic disk 1 and the mask stage 61 carrying the mask 12 are moved in directions orthogonal to the energy beam 11, and the scanning with the energy beams 11 are made in the radial directions of the magnetic disk 1 and the mask 12 in a synchronized condition.

Accordingly, with the advantages of the magnetic pattern forming apparatus and method according to this embodiment, in a case in which a magnetic pattern is formed on the magnetic disk 1 by means of a combination of the local heating and the exposure to an external magnetic field, a minute magnetic pattern is formable efficiently with higher accuracy, which leads to providing a higher-density recording type magnetic disk and magnetic recording apparatus in a small amount of time and at a low cost.

In addition, without employing a large-sized illuminating optical system 63 (particularly, light source 41) or projection optical system 64, it is possible to form a magnetic pattern on the magnetic disk 1 briefly and efficiently through the use of a small-sized and low-priced illuminating optical system 63 (particularly, light source 41) or projection optical system 64 [system which can apply a beam to only a small area on the magnetic disk 1 (that is, system having a small imaging range)], thus realizing high productivity.

In the above-described embodiment, although the mask stage 61, the projection optical system 64 and the disk stage 60 are disposed in series along the energy beam 11, it is also possible to, in a state where the components of the magnetic pattern forming apparatus and the operations thereof remain unchanged, change only the disposition of the components.

Figure 6:
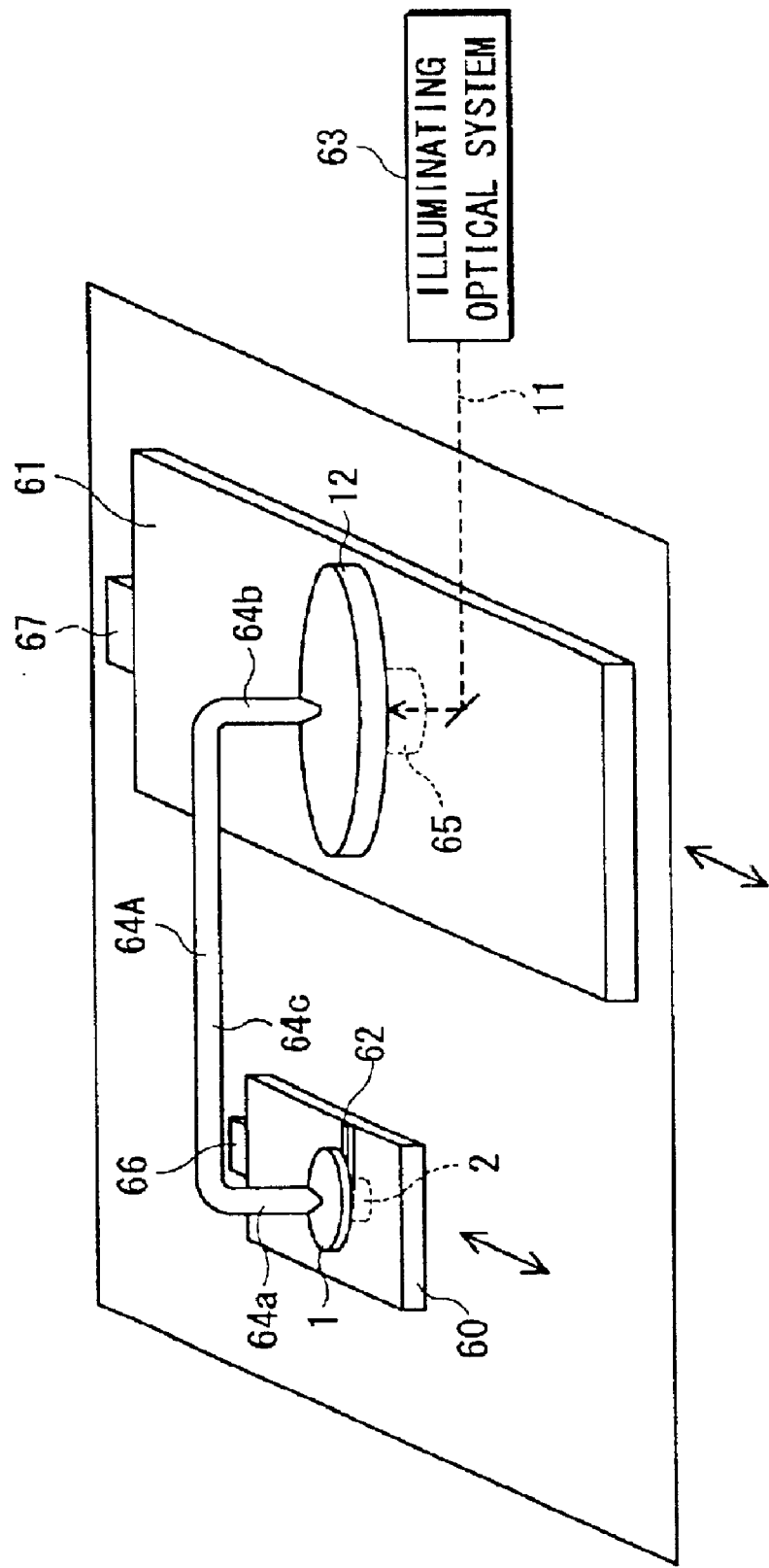
FIG. 6 is a perspective view illustratively showing an entire configuration of a magnetic pattern forming apparatus according to a modification of the first embodiment of the present invention.

That is, for example, as FIG. 6 shows, the disk stage 60 and the mask stage 61 (namely, the magnetic disk 1 and the mask 12) are put side by side (or juxtaposed) on the same plane.

In addition, a projection optical system 64A is constructed as an inverted U-shaped type (inverse U-shaped) cylindrical member so that an energy beam (an optical axis of a laser beam) has an inverted U-like configuration (inverse U-like configuration), and is composed of an entrance 64a constituting one end portion thereof, an exit 64b constituting the other end portion thereof and a linear main part 64c making connection between the entrance 64a and the exit 64b.

Still additionally, the projection optical system 64A is located in opposed relation to the magnetic disk 1 and the mask 12. That is, the entrance 64a of the projection optical system 64A is positioned to face the mask 12 while the exit 64b thereof is positioned to face the magnetic disk 1.

In this case, the disk stage 60 and the mask stage 61 are designed to be moved in the same plane in the same direction in a synchronized condition (translation motion).

In the above-described embodiment, although the magnetic field applying means 62 has a bar-like configuration extending radially throughout the generally entire length of the magnetic disk 1, any device is also acceptable if it can apply a magnetic field to at least a portion (illuminated portion, illuminated position) of the magnetic disk 1 heated by a spot-like energy beam 11. For example, as well as a magnetic field applying means according to a second embodiment which will be described later, it is also possible to use a type which can be attached to the tip portion of the exit of the projection optical system 64 (see FIGS. 9A and 9B).

(Description of Magnetic Recording Apparatus)

A magnetic recording apparatus according to this embodiment is made up of the above-mentioned magnetic disk 1, a driving section for driving the magnetic disk 1 in a recording direction, a magnetic head comprising a recording section and a reproducing section, a means for moving the magnetic head relatively with respect to a magnetic recording medium, and a recording/reproduced signal processing means for making the input of a recording signal to the magnetic head and the output of a reproduced signal from the magnetic head. In general, for high-density recording, the magnetic head to be used is of a flying/contact type.

Because of the use of a magnetic disk having a formed minute and high-accuracy magnetic pattern such as a servo pattern, this magnetic recording apparatus enables high-density recording. Moreover, since no flaw and less defect exists on the magnetic disk, the recording with less error becomes possible.

In addition, even if the present invention is applied to a magnetic recording apparatus made such that, after a magnetic disk is incorporated into the apparatus, the aforesaid magnetic pattern is read out by a magnetic head to obtain a reproduced signal so that a servo burst signal is recorded by the magnetic head with this reproduced signal being used as a standard signal, a precise servo signal is easily obtainable.

Still additionally, if a signal recorded as a magnetic pattern according to the present invention is left in other than a user data area even after the servo burst signal is recorded by the magnetic head, when the position of the magnetic head shifts due to some disturbance, the magnetic head can easily be returned to a desired position. Accordingly, this offers a high-reliability magnetic recording apparatus in which the signals according to both the writing methods exist.

The magnetic recording apparatus according to the present invention comprises at least one magnetic disk mentioned above, a driving section for driving this magnetic disk in a recording direction, a magnetic head including a recording section and a reproducing section, a means for moving the magnetic head relatively with respect to the magnetic disk, and a recording/reproduced signal processing means for making the input of a signal to the magnetic head and the output of a reproduced signal from the magnetic head.

In addition, when the present invention is applied to a magnetic recording apparatus made such that, after a magnetic disk is incorporated into the apparatus, the aforesaid magnetic pattern is read out by a magnetic head to obtain a reproduced signal so that a servo burst signal is recorded by the magnetic head with reference being made to this reproduced signal, a precise servo signal is easily obtainable. Moreover, if a signal recorded as a magnetic pattern according to the present invention is left in other than a user data area even after the servo burst signal is recorded by the magnetic head, when the position of the magnetic head shifts due to some disturbance, the magnetic head can easily be returned to a desired position. Accordingly, magnetic recording apparatus in which the signals according to both the writing methods exist offers high reliability.

A description will be given hereinbelow of an example of magnetic disk apparatus represented as a magnetic recording apparatus.

The magnetic disk apparatus is made up of a shaft for fixing one magnetic disk or a plurality of magnetic disks in a commonly skewering manner, a motor for turning the magnetic disk joined through a bearing to the shaft, a magnetic head to be used for recording and/or reproduction, an arm for holding the head, and an actuator capable of shifting the head through the head arm to an arbitrary position above a magnetic recording medium, with the recording/reproducing head being moved at a constant flying quantity above the magnetic recording medium. The recording information is converted through the signal processing means into a recording signal which in turn, is recorded by the magnetic head. Moreover, the reproduced signal read out by the magnetic head is inversely converted through the same signal processing means to acquire reproduced information.

On the disk, information signals are recorded in units of sectors along concentric tracks. A servo pattern is generally recorded between the sectors. The magnetic head reads a servo signal from the pattern to precisely perform the tracking to the center of a track for reading out the information signal in that sector. In like manner, the tracking is made also at the recording.

As mentioned above, since a servo pattern which generates a servo signal, is made to be used for the purpose of the tracking in the recording of information, it is particularly required to have high accuracy. Moreover, a servo pattern which has presently been put to use comprises two sets of patterns shifted by ½ pitch from each other in each track and, hence, is required to be formed at an interval of ½ pitch of the information signal, so the double accuracy is necessary.

However, in the case of a conventional servo pattern forming method, because of the influence of vibration occurring due to the difference in center of gravity between an external pin and an actuator, the limit of a write track width becomes 0.2 to 0.3 $\mu$m, and the servo pattern accuracy cannot catch up with the increase in track density, which tends to cause the hindrance to the recording density improvement and cost reduction of a magnetic recording apparatus.

According to this embodiment, since a high-accuracy magnetic pattern can efficiently be formed through the use of a reduction projection technique, as compared with the conventional servo pattern forming method, it is possible to form a servo pattern at a considerably lower cost and in a considerably smaller amount of time, and for example, it is possible to enhance the track density of a magnetic disk to above 40 kTPI. Accordingly, a magnetic recording apparatus using this magnetic disk can provide high-density recording.

In addition, since the use of a phase shift servo system can offer a continuously varying servo signal, it is possible to enhance the track density, and to conduct the tracking below a width of 0.1 $\mu$m, thus achieving higher-density recording.

As described above, a magnetic pattern extending linearly and obliquely with respect to a radial direction from an inner circumference to an outer circumference is used for a phase shift servo system. With the conventional servo pattern forming method in which a servo signal is recorded by each track while a disk is rotated, it is relatively hard to form such a radially continuing pattern or oblique pattern, and it is required to use complicated calculation or arrangement therefor.

On the other hand, according to this embodiment, if a mask corresponding to the aforesaid pattern is once produced, the pattern can easily be formed simply by producing a reduced image at a desired position on a disk with an energy beam after passed through the mask; therefore, a magnetic disk for use in a phase shift servo system is easily producible in a small amount of time and at a low cost, thus leading to providing a phase shift servo type magnetic recording apparatus capable of achieving the high-density recording.

In particular, this embodiment is suitable for high-density recording on a small-diameter magnetic disk because the energy beam is narrowed down, and preferably applicable to a magnetic disk having a diameter less than or equal to 65 mm, more preferably less than or equal to 2 inches, and much more preferably less than or equal to 1 inch.

So far, as the main currents of servo pattern forming methods, after a magnetic disk is incorporated into a magnetic recording apparatus (drive), the servo pattern formation is implemented with a dedicated servo writer in a clean room.

In this case, after each drive is mounted in a servo writer, patterns are recorded along a track one by one while the magnetic head is mechanically moved in a state where a pin of a servo writer inserted into a hole made in one of a face or back of the drive, so it takes time as long as 15 to 20 minutes per drive. Since a hole is made in the drive in addition to the use of the dedicated servo write, these works are required to done in a clean room, which leads to a cumbersome process and an increase in cost.

According to this embodiment, since the illumination with an energy beam is made through a mask on which a pattern is recorded in advance, a servo pattern or a standard pattern for the recording of the servo pattern can be recorded collectively, which enables the formation of a servo pattern to be implemented in an extremely easy way and in a small amount of time. In the case of a magnetic recording apparatus accommodating a magnetic disk having a servo pattern formed in this way, the aforesaid servo pattern writing process becomes unnecessary.

On the other hand, for a magnetic recording apparatus accommodating a magnetic disk having a standard pattern for the recording of a servo pattern, a desired servo pattern is writable in the apparatus on the basis of the standard pattern, which eliminates the need for the use of the aforesaid servo writer and for the work in a clean room.

Add to it that, since there is no need to make a hole in the back of the magnetic recording apparatus, the durability and safety are preferably improvable.

Furthermore, according to the present invention, since a space equivalent to a focal length is defined between the imaging means and the magnetic disk, it is possible to prevent the magnetic disk from being damaged due to the contact with other components or due to the insertion of microscopic dirt particles or dust, thus avoiding the occurrence of defects.

As described above, this embodiment can provide a magnetic recording apparatus, capable of achieving high-density recording, in a simple process and at a low cost.

As the magnetic head to be used, there are various types of heads such as a thin-film head, an MR head, a GMR head and a TMR head.

When the reproducing section of the aforesaid magnetic head is constructed with an MR head, even in the case of the high recording density, a sufficient signal strength is attainable, which contributes to the realization of a magnetic recording apparatus whereby higher recording density is achievable.

If this magnetic head is used at a flying height more than or equal to 0.001 $\mu$m but less than 0.05 $\mu$m, below that of the conventional technique, the improved output is obtainable, which provides high apparatus S/N and offers a magnetic recording apparatus with a high capacity and with high reliability.

In addition, if a signal processing circuit based on a most likelihood decode method is used in a combined state, the recording density is further improvable, and for example, even in the case of the recording/reproduction at a track density of 13 kTPI or more, a linear recording density of 250 kFCI and a recording density of 3 Gbit or more per square inch, a sufficient S/N is attainable.

Still additionally, if the reproducing section of the magnetic head is constructed as a GMR head comprising a plurality of conductive magnetic layers, whose resistance varies greatly when their magnetizing directions vary relatively with an external magnetic field, and conductive non-magnetic layers placed among the conductive magnetic layers, or a GMR head utilizing the spin-valve effect, it is possible to further enhance the signal strength, thus realizing a high-reliability magnetic recording apparatus having a recording density exceeding 10 Gbit per square inch and a linear-recording density exceeding 350 kFCI.

(Description of Second Embodiment)

Furthermore, referring to FIGS. 7, 8, 9A and 9B, a description will be given hereinbelow of a magnetic pattern forming apparatus and method, magnetic disk and magnetic recording apparatus according to a second embodiment of the present invention.

A difference of the magnetic pattern forming apparatus according to this embodiment from the above-described first embodiment is a construction for scanning with an energy beam in radial directions of a magnetic disk and a mask.

Figure 7:
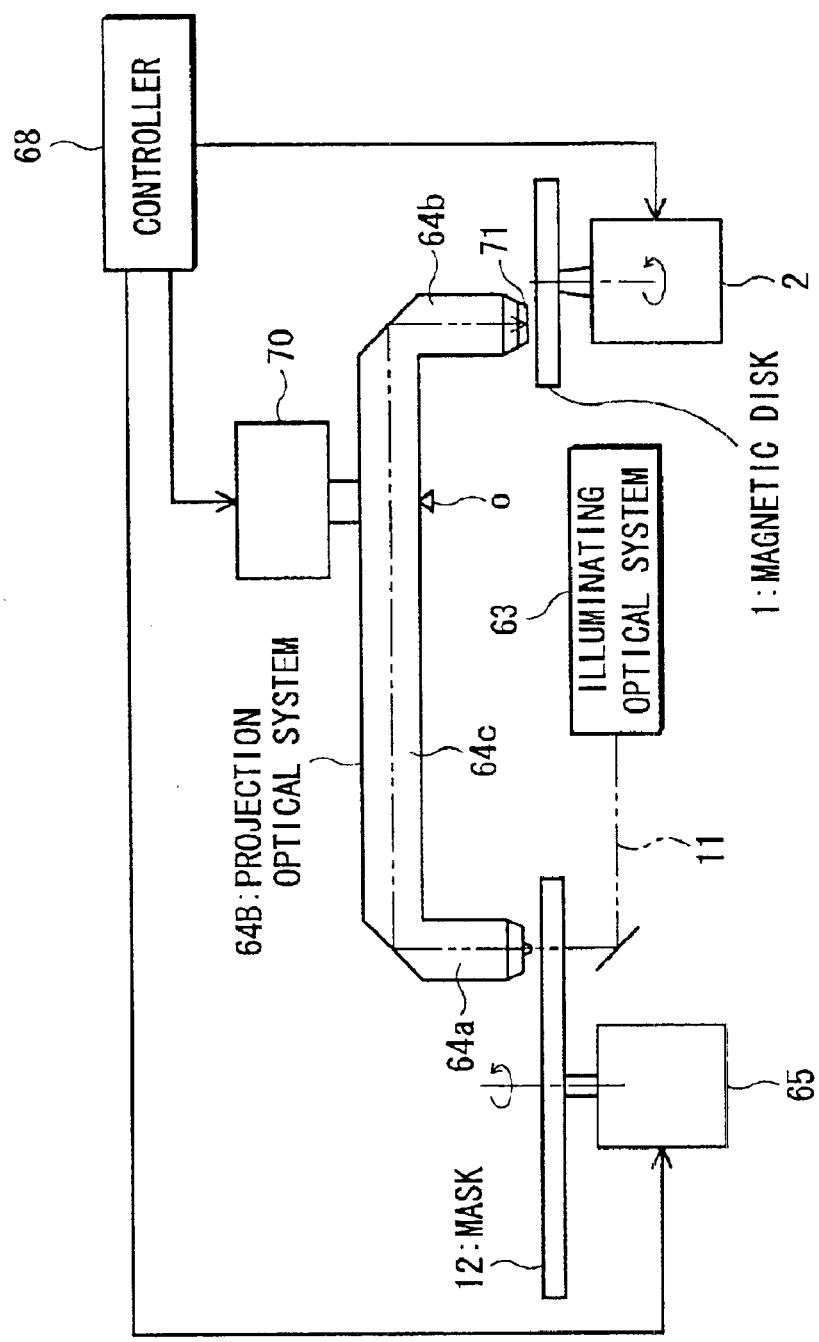
FIG. 7 is a side elevational view illustratively showing an entire configuration of a magnetic pattern forming apparatus according to a second embodiment of the present invention.
Figure 8:
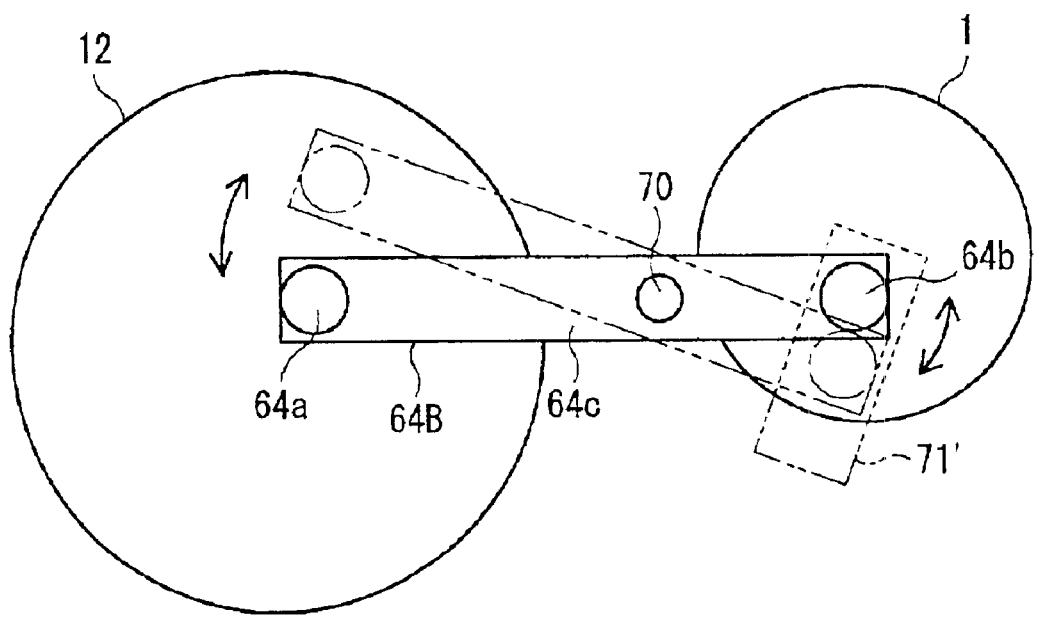
FIG. 8 is a plan view useful for explaining an operation of the magnetic pattern forming apparatus according to the second embodiment of the present invention.

That is, in the above-described first embodiment, the illuminating optical system 63, the projection optical system 64 and the magnetic field applying means 62 are set in fixed conditions and the disk stage 60 and the mask stage 61 are moved (operated for scanning) in a direction orthogonal to the energy beam 11 (the optical axis of a laser beam) given through the illuminating optical system 63 and the projection optical system 64, whereas in this embodiment, as shown in FIGS. 7 and 8, the positions of a magnetic disk 1 and a mask 12 are fixed (however, the magnetic disk 1 and the mask 12 are rotated) and a projection optical system 64B is to be rotated (operated for scanning, shifted, or rocked).

In addition, in the above-described first embodiment, the magnetic field applying means 62 is fixed, whereas in this embodiment, the magnetic field applying means 71 is made to be rotated (moved) together with the projection optical system 64B. Still additionally, although, in the above-described first embodiment, the position of the energy beam illumination made through the illuminating optical system 63 is fixed, in this embodiment, the position of the energy beam illumination made through the illuminating optical system 63 is made to be changed to the position of the projection optical system 64B.

Concretely, in this magnetic pattern forming apparatus, the magnetic disk 1 and the mask 12 are juxtaposed on the same plane as shown in FIGS. 7 and 8. Incidentally, in this embodiment, since there is no need to move the magnetic disk 1 and the mask 12, a disk stage and a mask stage are not provided therein.

In addition, the projection optical system 64B is constructed as an inverted U-shaped (inverse U-like) cylindrical member so that an energy beam runs along an inverted U-like (inverse U-like) configuration, and is composed of an entrance 64a constituting its one end portion, an exit 64b constituting the other end portion and a linear main part 64c making connection between the entrance 64a and the exit 64b.

Still additionally, the projection optical system 64B is located in opposed relation to the magnetic disk 1 and the mask 12. That is, the projection optical system 64B is disposed so that the entrance 64a of the projection optical system 64B is placed in opposed relation to the mask 12 while the exit 64b thereof is situated in opposed relation to the magnetic disk 1.

In particular, the projection optical system 64B thus constructed is made such that the main part 64c extending linearly is supported at a supporting point O to be rotatable around this supporting point (fixed point) O (with the supporting point O serving as the center of rotation).

In this case, at the supporting point O of the linear main part 64c, the projection optical system 64B is connected to a rotary shaft (spindle, supporting member) of a projection optical system spindle motor 70 which will be mentioned later. The operation of this projection optical system spindle motor 70 rotates the projection optical system 64B with the supporting point O (spindle connection portion) serving as the center of rotation.

At this time, the position of the supporting point O, i.e., the position of the supporting point O on the linear main part 64c, is determined in accordance with as projection ratio to be taken for when a reduction projection is made through the projection optical system 64B. That is, a predetermined reduction ratio for the reduction projection using the projection optical system 64B is set on the basis of a ratio of a distance from the supporting point O to the entrance 64a and a distance from the supporting point O to the exit 64b.

For example, in a case in which the predetermined reduction ratio for the reduction projection is set to ½, the distance between the supporting point O and the entrance 64a and the distance between the supporting point O and the exit 64b are determined so that the ratio thereof is 2 to 1.

The change of the position of the supporting point O according to the predetermined reduction ratio can change the rotating radius at the rotation of the projection optical system 64B; inconsequence, the moving distance of the entrance 64a and the moving distance of the exit 64b when the projection optical system 64B is put to rotation can be set according to the predetermined reduction ratio. Therefore, the application to a reduction projection is particularly preferable.

It is also appropriate that the ratio of the distance between the supporting point O and the entrance 64a and the distance between the supporting point O and the exit 64b is set to 1:1 and the control means 68 controls the rotational speeds of the magnetic disk 1 and the mask 12 on the basis of a ratio of the rotational speeds of the magnetic disk 1 and the mask 12 set according to a predetermined reduction ratio.

In addition, the projection optical system 64B can be rotated around the supporting point O so that the entrance 64a is moved (rotated, shifted for scanning) in a radial direction of the mask 12 to draw an arcuate locus and, at the same time, the exit 64b is moved (rotated, shifted for scanning) in a radial direction of the magnetic disk 1 to draw an arcuate locus.

For example, in a case in which the entrance 64a is moved along the radial direction of the mask 12 from a point in the vicinity of the central portion of the mask 12 to a point in the vicinity of the outermost circumferential portion thereof, the exit 64b is shifted from a point in the vicinity of the outermost circumferential portion of the magnetic disk 1 to a point in the vicinity of the central portion thereof along a radial direction of the magnetic disk 1. On the other hand, in a case in which the exit 64b is moved along a radial direction of the magnetic disk 1 from a point near the central portion of the magnetic disk 1 to a point near the outermost circumferential portion thereof, the entrance 64a is shifted from a point near the outermost circumferential portion of the mask 12 to a point near the central portion thereof. Thus, the entrance 64a and the exit 64b are moved in opposite directions.

Incidentally, because the projection optical system 64 B is moved to perform the scanning with the energy beam 11 in the radial directions of the magnetic disk 1 and the mask 12, it is called a lens scanning system.

Accordingly, as FIG. 7 shows, this magnetic pattern forming apparatus comprises, in addition to the disk spindle motor (disc rotating actuator, disc rotating means) 2 for rotating the disk 1 and the mask spindle motor (mask rotating actuator, mask rotating means) 65 for rotating the mask 12, a projection optical system spindle motor 70 and a controller (control means) 68 for controlling these disk spindle motor 2, mask spindle motor 65 and projection spindle motor 70.

The projection optical system spindle motor (projection optical system actuator, projection optical system rotating means, entrance rotating means, exit rotating means) 70 has a positioning control function to accurately control an angle of rotation of the projection optical system 64 with respect to the magnetic disk 1 and the mask 12. For this reason, it is called a positioning control function included spindle motor.

The control means 68 controls the operations of the disk spindle motor 2 and the mask spindle motor 65 to rotate the magnetic disk 1 and the mask 12 at equal speeds and outputs a control signal to control the operation of the projection optical system spindle motor 70 so that the energy beam 11 for the magnetic disk 1 and the energy beam 11 for the mask 12 takes a synchronized condition for scanning.

In this case, in outputting a control signal for controlling the operation of the projection optical system spindle motor 70, the control means 68 controls a rotating quantity (moving quantity), a rotational speed (moving speed) and others of the main part 64c.

For example, the magnetic field applying means 71 is constructed as a bar-like magnetic field applying means 71' extending throughout the generally overall length of the magnetic disk 1 in its radial direction as indicated by a two-dot chain line in FIG. 8.

In this case, as in the case of the above-described first embodiment, the magnetic field applying means 71' is equipped with a yoke and a pair of permanent magnets (for example, NdFe magnets or the like), and the pair of permanent magnets are fixed onto the yoke in a state where their magnetic poles are set in opposite directions so that a magnetic field is produced to make connection between the N-pole of one permanent magnet and the S-pole of the other permanent magnet.

However, in consideration of the exposure of as a small area as possible to an external magnetic field, it is preferable that an area to which the external magnetic field is applied by the magnetic field applying means 71 is only a portion (energy beam applied portion, energy beam applied position) heated by exposure to the energy beam 11. This is because, even if the magnetic field is weak, when the magnetic field strikes on a portion other than the energy beam applied portion, there is a possibility that an unexpected reverse magnetization takes place.

For this reason, in this embodiment, the magnetic field applying means 71 is attached to the tip portion of the exit 64b of the projection optical system 64B to be movable together with the projection optical system 64B as shown in FIG. 7.

Figure 9A:
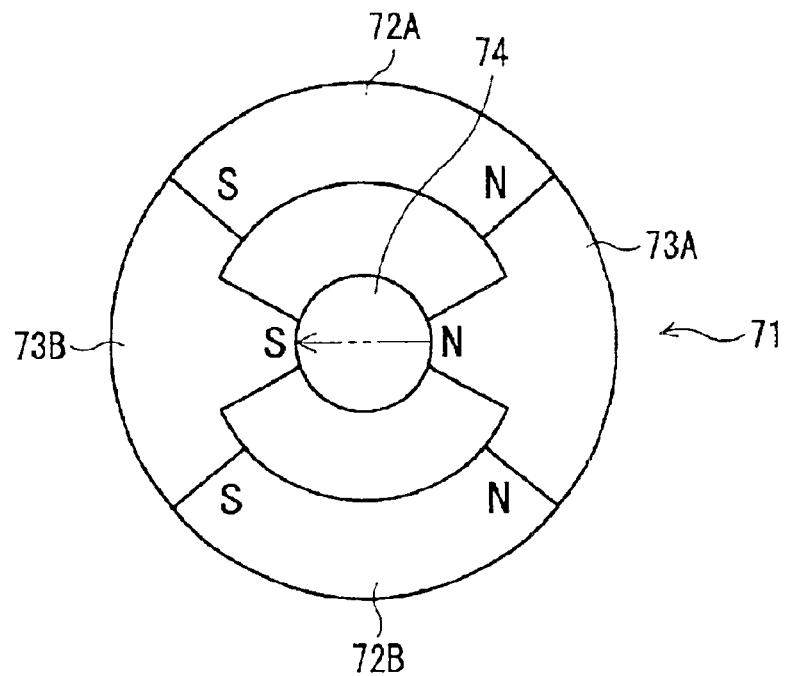
FIG. 9A is a plan view illustratively showing a magnetic field applying means of the magnetic pattern forming apparatus according to the second embodiment of the present invention.
Figure 9B:
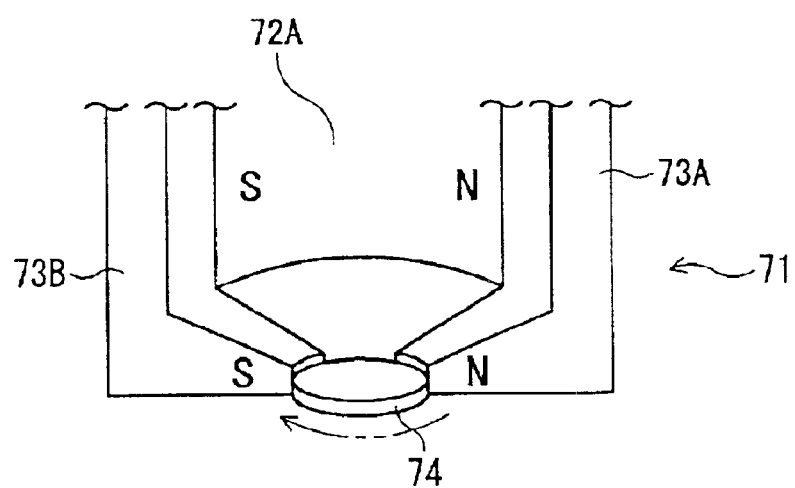
FIG. 9B is a plan view illustratively showing a magnetic field applying means of the magnetic pattern forming apparatus according to the second embodiment of the present invention.

As FIGS. 9A and 9B show, this magnetic field applying means 71 is composed of a pair of permanent magnets (for example, NdFe magnets or the like) 72A, 72B and a pair of ferromagnetic members (magnetic material; for example, Fe or the like) 73A, 73B.

That is, an objective lens 74 located at the tip side of the exit 64b of the projection optical system 64B is interposed and held between the tip portions of the pair of ferromagnetic members 73A and 73B, and the permanent magentas 72A and 72B are set between one side surface of the ferromagnetic member 73A and one side surface of the ferromagnetic member 73B and between the other side surface of the ferromagnetic member 73A and the other side surface of the ferromagnetic member 73B, respectively, thereby organizing the magnetic field applying means 71.

In this case, the N-poles of the permanent magnets 72A and 72B exist on the ferromagnetic member 73A side while the S-poles of the permanent magnets 72A and 72B lie on the ferromagnetic member 73B side, and the ferromagnetic members 73A and 73B are magnetized by the magnetic fields from the permanent magnets 72A and 72B so that the tip portion of the ferromagnetic member 73A becomes an N-pole while the tip portion of the ferromagnetic member 73B becomes an S-pole.

As a result, as indicated by two-dot chain lines in FIGS. 9A and 9B, in the vicinity of the objective lens 74 placed on the exit 64b of the projection optical system 64B, a magnetic field occurs in a direction from the tip portion of the ferromagnetic member 73A being the N-pole to the tip portion of the ferromagnetic member 73B being the S-pole to make connection between the ferromagnetic member 73A and the ferromagnetic member 73B. Moreover, this magnetic field is set to be larger than the corecivity of the magnetic disk 1 in a state heated, and when the magnetic field applying means 71 is brought close to the magnetic disk 1, the magnetic layer 22a on the upper surface side of the magnetic disk 1 is magnetized in a longitudinal direction and in a circumferential direction.

In addition, in this embodiment, since the position of the entrance 64a of the projection optical system 64B varies, unlike the above-described first embodiment, the illuminating optical system 63 is made so that the incident position of an energy beam on the entrance 64a can be changed to the position of the projection optical system 64B.

Concretely, as this illuminating optical system 63, for example, a galvanometer and an f-θ lens can be used so that an arbitrary position on the magnetic disk 1 (or the mask 12) is illuminated with a spot-like energy beam 11. That is, in a manner that the angle of the energy beam 11 is varied as occasion calls so that the energy beam 11 is incident on the f-θ lens, the illumination of an arbitrary position on the magnetic disk 1 becomes feasible.

The other construction of this magnetic pattern forming apparatus and the magnetic pattern forming method are similar to those in the above-described first embodiment.

Accordingly, with the magnetic pattern forming apparatus and method according to this embodiment, in a case in which a magnetic pattern is formed on the magnetic disk 1 by means of a combination of the local heating and the exposure to an external magnetic field, it is possible to efficiently form a minute magnetic pattern with higher accuracy, which leads to providing a magnetic disk and magnetic recording apparatus, capable of achieving higher-density recording, in a small amount of time and at a low cost.

In addition, without employing a large-sized illuminating optical system 63 (particularly, light source 41) or projection optical system 64B, it is possible to form a magnetic pattern on the magnetic disk 1 briefly and efficiently through the use of a small-sized and low-priced illuminating optical system 63 or projection optical system 64 [system which can apply a beam to only a small area on the magnetic disk 1 (that is, system having a small imaging range)], thus realizing high productivity.

Still additionally, simply by rotating the projection optical system 64B, the magnetic disk 1 (mask 12) can be scanned with the energy beam 11 in its radial direction, so the construction can be made at a low cost.

Yet additionally, since the projection optical system 64B is rotated by the projection optical system spindle motor 70 to move the entrance 64a and the exit 64b unitarily, there is no need to execute the synchronous control on the entrance 64a and the exit 64b, there is an advantage of simplifying the control.

In this embodiment, although the rotation of the projection optical system 64B is under control of the controller 68, the present invention is not limited to this, but it is also acceptable that, for example, the projection optical system 64B is rotated manually.

(Description of Third Embodiment)

Furthermore, referring to FIG. 10, a description will be given hereinbelow of a magnetic pattern forming apparatus and method, magnetic disk and magnetic recording apparatus according to a third embodiment of the present invention.

A difference of the magnetic pattern forming apparatus according to this embodiment from the apparatus according to the above-described first embodiment is a construction for making a scan with an energy beam in radial directions of a magnetic disk and a mask.

Figure 10:
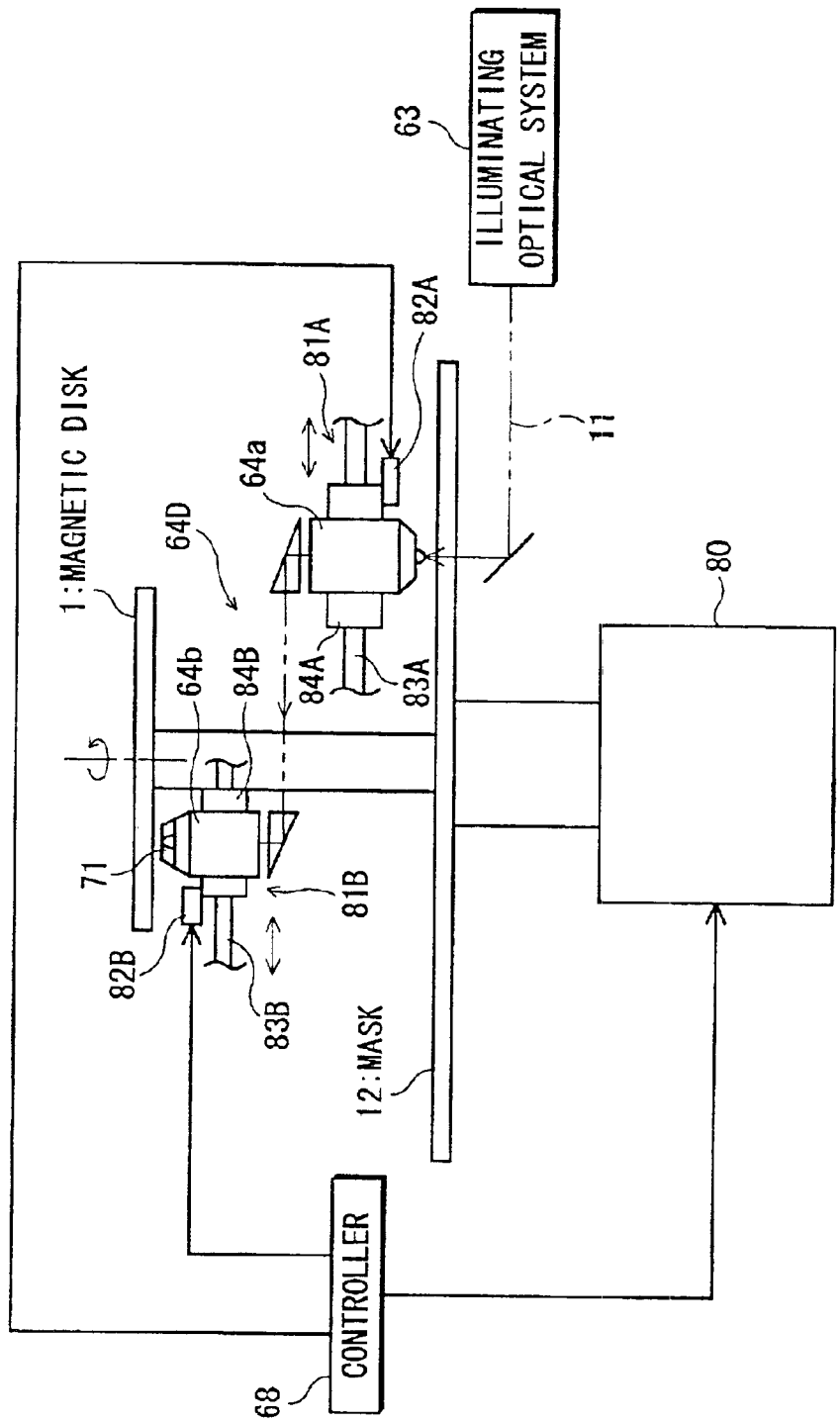
FIG. 10 is a side elevational view illustratively showing an entire configuration of a magnetic pattern forming apparatus according to a third embodiment of the present invention.

That is, in the above-described first embodiment, the illuminating optical system 63, the projection optical system 64 and the magnetic field applying means 62 are set in fixed conditions and the disk stage 60 and the mask stage 61 are moved (operated for scanning) in a direction orthogonal to the energy beam 11 (the optical axis of a laser beam) given through the illuminating optical system 63 and the projection optical system 64, whereas in this embodiment, as shown in FIG. 10, the positions of a magnetic disk 1 and a mask 12 are fixed (however, the magnetic disk 1 and the mask 12 are rotated) and a projection optical system 64D is made to be moved (operated for scanning).

Moreover, although the magnetic field applying means 62 is fixed in the above-described first embodiment, in this embodiment, a magnetic field applying means 71 is designed to be moved together with the projection optical system 64D. Still moreover, although the position of the energy beam illumination made through the illuminating optical system 63 is fixed in the above-described first embodiment, in this embodiment, the position of the energy beam illumination made through the illuminating optical system 63 is varied to the position of the projection optical system 64D.

Concretely, as FIG. 10 shows, this magnetic pattern forming apparatus is equipped with a disk/mask spindle motor 80 capable of rotating the disk 1 and the mask 12.

This disk/mask spindle motor (disk/mask rotating actuator, mask/disk rotating actuator, disk rotating means, mask rotating means) 80 is composed of a motor 80a and a spindle serving as a rotary shaft of the motor 80a. In this case, as the spindle, there are provided a mask spindle 80*b* for rotating the mask 12 and a disk spindle 80*c* for rotating the magnetic disk 80*c*. These mask spindle 80*b* and disk spindle 80*c* are located coaxially.

When the magnetic disk 1 is held by the disk spindle 80*c* and the mask 12 is held by the mask spindle 80*b*, the magnetic disk 1 and the mask 12 are disposed in parallel with each other in a state spaced vertically from each other on the same axis.

In addition, the magnetic disk 1 held by the disk spindle 80*c* and the mask 12 held by the mask spindle 80*b* are rotationally driven by a single motor 80*a*.

Incidentally, in this embodiment, since there is no need to move the magnetic disk 1 and the mask 12, neither disk stage nor mask stage exist.

Still additionally, as FIG. 10 shows, in the projection optical system 64D, an entrance 64*a* on which an energy beam 11 transmitted from the illuminating optical system 63 through the mask 12 is incident and an exit 64*b* from which the energy beam 11 is emitted toward the magnetic disk 1 are provided in a state separated from each other.

Moreover, the entrance 64*a* is disposed in opposed relation to the mask 12 while the exit 64*b* is placed in opposed relation to the magnetic disk 1.

Still moreover, the entrance 64*a* and the exit 64*b* are made to be movable independently of each other, and hence, the entrance 64*a* is equipped with an entrance moving means 81A for moving the entrance 64*a* and the exit 64*b* is provided with an exit moving means 81B for moving the exit 64*b*.

The entrance moving means 81A is composed of an entrance linear motor (entrance driving actuator, entrance driving means) 82A, a rail 83A placed to extend in parallel with the mask 12 and a supporting member 84A for supporting the entrance 64*a* so that the entrance 64*a* is on the rail 83A. That is, the entrance 64*a* is supported through the supporting member 84A to be on the rail 83A, and when the supporting member 84A for supporting this entrance 64*a* is driven by the entrance linear motor 82A, the entrance 64*a* is moved in parallel with a surface of the mask 12. Incidentally, the construction of the entrance moving means 81A is not limited to this.

The exit moving means 81B is composed of an exit linear motor (exit driving actuator, exit driving means) 82B, a rail 83B placed to extend in parallel with the magnetic disk 1 and a supporting member 84B for supporting the exit 64*b* so that the exit 64*b* is on the rail 83B. That is, the exit 64*b* is supported through the supporting member 84B to be on the rail 83B, and when the supporting member 84B for supporting the exit 64*b* is driven by the exit linear motor 82B, the exit 64*b* is moved in parallel with a surface of the magnetic disk 1. Incidentally, the construction of the exit moving means 81B is not limited to this.

In this case, since the scanning with the energy beam 11 is made in the radial directions of the magnetic disk 1 and the mask 12 by shifting the entrance 64*a* and the exit 64*b* constituting the projection optical system 64D, this system is called a lens scanning system.

Furthermore, as FIG. 10 shows, this magnetic pattern forming apparatus is additionally equipped with a controller (control means) 68 which controls the disk/mask spindle motor 80, the entrance linear motor 82A and the exit linear motor 82B.

The control means 68 has an operation control function to control the disk/mask spindle motor 80 to rotate the magnetic disk 1 and the mask 12 at equal speeds and to output a control signal to the entrance linear motor 82A and the exit linear motor 82B so that the energy beam 11 to be applied to the magnetic disk 1 and the energy beam 11 to be applied to the mask 12 take a synchronous condition for scanning.

In this case, the control means 68 outputs a control signal to the entrance linear motor 82A for controlling the operation thereof, and at this time, controls the moving quantity, moving speed and others of the entrance 64*a*.

In like manner, the control means 68 outputs a control signal to the exit linear motor 82B for controlling the operation thereof, and at this time, controls the moving quantity, moving speed and others of the exit 64*b*.

In addition, the control means 68 outputs the control signals to the entrance linear motor 82A and the exit linear motor 82B in a synchronized condition so that the entrance 64*a* and the exit 64*b* are moved in a synchronized condition.

Still additionally, the control means 68 is made to control the moving speeds of the entrance 64*a* and the exit 64*b* on the basis of a ratio of a speed (moving speed) at which the entrance 64*a* is moved and a speed at which the exit 64*b* is moved, set according to a reduction ratio to be taken for when the magnetic disk 1 is illuminated with the spot-like energy beam 11 to project a mask pattern onto the magnetic disk 1 at a predetermined reduction ratio.

For example, in a case in which the reduction ratio for the reduction projection is set to ½, a ratio of the moving speed of the entrance 64*a* and the moving speed of the exit 64*b* is set to be 2 to 1.

In this way, the entrance 64*a* and the exit 64*b* are made to be movable separately and independently so that the moving speeds thereof can be changed according to the predetermined reduction ratio, thus dealing particularly with the reduction projection.

It is also appropriate that the control means 68 controls the rotational speeds of the magnetic disk 1 and the mask 12 on the basis of a ratio of the rotational speed of the magnetic disk 1 and the rotational speed of the mask 12 set according to the predetermined reduction ratio, and controls the moving speeds of the entrance 64*a* and the exit 64*b* to equal speeds.

Furthermore, in this embodiment, the projection optical system 64D is made to be rotated as mentioned above, and since the position of the exit 64*b* of the projection optical system 64D relative to the magnetic disk 1 varies accordingly, as in the case of the above-described second embodiment, the magnetic field applying means 71 is attached to the tip portion of the exit 64*b* of the projection optical system 64D to be movable with the exit 64*b*.

The concrete construction of the magnetic field applying means 71 is the same as that of the above-described second embodiment, and as well as the second embodiment, the magnetic field applying means 71 is constructed as a bar-like magnetic field applying means extending throughout the generally overall length of the magnetic disc 1 in its radial direction Still furthermore, since the position of the entrance 64*a* of the projection optical system 64D varies, as well as the second embodiment, the illuminating optical system 63 is made such that the position at which the energy beam 11 is incident on the entrance 64*a* can be changed to the position of the projection optical system 64D.

The other construction of this magnetic pattern forming apparatus and the magnetic pattern forming method are similar to those in the above-described first embodiment.

Accordingly, with the magnetic pattern forming apparatus and method according to this embodiment, in a case in which a magnetic pattern is formed on the magnetic disk 1 by means of a combination of the local heating and the exposure to an external magnetic field, it is possible to efficiently form a minute magnetic pattern with higher accuracy, which leads to providing a magnetic disk and magnetic recording apparatus, capable of achieving higher-density recording, in a small amount of time and at a low cost.

In addition, without employing a large-sized illuminating optical system 63 (particularly, light source 41) or projection optical system 64D, it is possible to form a magnetic pattern on the magnetic disk 1 briefly and efficiently through the use of a small-sized and low-priced illuminating optical system 63 or projection optical system 64 [system which can apply a beam to only a small area on the magnetic disk 1 (that is, system having a small imaging range)], thus realizing high productivity.

Still additionally, in this embodiment, the magnetic disk 1 and the mask 12 are driven by a single motor 80; therefore, this offers an advantage of making the entire apparatus compact.

In this connection, in the description of each of the above-described embodiments, the magnetic disk 1 is designed as a longitudinal magnetic recording medium on which the magnetization is made in a longitudinal direction and for efficient exposure to an external magnetic field while lowering the cost of the magnetic field applying means 62, the magnetic field applying means 62 is designed to apply the external magnetic field to a partial area (area corresponding to the energy beam applied position) of the magnetic disk 1. On the other hand, as a matter of course, in a case in which the magnetic disk 1 is constructed as a perpendicular magnetic recording medium on which the magnetization is made in a perpendicular direction, for the application of the present invention, the magnetic field applying means 62 is made to magnetize it in the perpendicular direction.

In this case, the magnetic field applying means 62 is designed to be capable of exposing the entire surface of the magnetic disk 1 to an external magnetic field. For example, a cylindrical permanent magnet or solenoid having a diameter larger than the diameter of the magnetic disk 1 is put to use therefor.

Moreover, in the description of each of the above-described embodiments, although the magnetic pattern forming apparatus (method) is made to perform the reduction projection at a predetermined reduction ratio, the present invention is not limited to this, but it is also appropriate that the projection is made at a one-to-one ratio or a magnification ratio.

Still moreover, in each of the above-described embodiments, although, in a state where the magnetic disk 1 and the mask 12 are rotated, the disk state 60 and the mask stage 61 are moved (first embodiment), the projection optical system 64B is rotated (second embodiment) or the projection optical system 64D is moved (third embodiment) for making the scanning with an energy beam spirally or concentrically, the present invention is not limited to these methods. For example, it is also appropriate that the illuminating optical system is designed to be capable of varying the illumination position (illumination angle) and the energy beam illumination position is shifted for the scanning in the radial directions of the magnetic disk 1 and the mask 12 by means of the illuminating optical system for the spiral or concentric illumination with the energy beam 11.

Concretely, as this illuminating optical system, for example, a galvanometer and an f-θ lens are used which are capable of applying a spot-like energy beam 11 to an arbitrary position on the magnetic disk 1 (or the mask 12). With this construction, the energy beam illumination angle (illuminating direction) is changed on occasion by means of the galvanometer so that the energy beam 11 is incident on the f-θ lens so that the scanning with the energy beam 11 is spirally made with respect to the magnetic disk 1. Alternatively, the energy beam illumination angle (illuminating direction) is stepwise changed more-than-one times by the galvanometer so that the energy beam 11 is incident on the f-θ lens, thereby accomplishing the concentric scanning with the energy beam 11 with respect to the magnetic disk 1.

While the invention has been described in detail and with reference to specific embodiments thereof, it will be apparent to one skilled in the art that various changes and modifications can be made therein without departing from the spirit and scope thereof.

This application is based on Japanese patent application No. 2001-015824 filed on Jan. 24, 2001, the entire contents thereof being hereby incorporated by reference.

What is claimed is:

1. A magnetic pattern forming method of forming a desired magnetic pattern on a magnetic disk by applying a spot-like energy beam through a mask to said magnetic disk, having a magnetic layer on a substrate, for heating a portion of said magnetic layer concurrently with exposing the heated portion of said magnetic layer to an external magnetic field, comprising the steps of:

making a scan with said spot-like energy beam in radial directions of said magnetic disk and said mask while rotating said magnetic disk and said mask; and projecting a pattern formed on said mask at one of a one-to-one ratio and a predetermined reduction ratio for the formation of said desired magnetic pattern on said magnetic disk.

2. A magnetic pattern forming method of forming a desired magnetic pattern on a magnetic disk by applying a spot-like energy beam through a mask to said magnetic disk, having a magnetic layer on a substrate, for heating a portion of said magnetic layer concurrently with exposing the heated portion of said magnetic layer to an external magnetic field, comprising the steps of:

making a spiral or concentric scan with said spot-like energy beam; and projecting a pattern formed on said mask at one of a one-to-one ratio and a predetermined reduction ratio for the formation of said desired magnetic pattern on said magnetic disk.

3. A magnetic pattern forming method according to claim 1 or 2, wherein said magnetic layer is previously magnetized evenly in a desired detection by exposing said magnetic disk to said external magnetic field, and said magnetic layer is applyed with said energy beam to be heated and, at the same time, the heated portion of said magnetic layer is exposed to said external magnetic field to be magnetized in a direction opposite to said desired direction for the formation of said desired magnetic pattern on said magnetic disk.

4. A magnetic pattern forming method according to claim 3, wherein, for said scan with said energy beam, a disk stage for supporting said magnetic disk and a mask stage for supporting said mask are moved in directions orthogonal to the axis of said energy beam.

5. A magnetic pattern forming method according to claim 4, wherein, in a case in which said magnetic disk and said mask are rotated at speeds equal to each other, a ratio of a mask stage moving speed to a disk stage moving speed is set on the basis of the one of said one-to-one ratio and said predetermined reduction ratio so that said mask stage and said disk stage are moved on the basis of said speed ratio.

6. A magnetic pattern forming method according to claim 3, wherein an optical system for the projection includes an entrance positioned in opposed relation to said mask and an exit positioned in opposed relation to said magnetic disk which are constructed in a separate condition, and at said scan with said energy beam, said exit is moved along a surface of said magnetic disk and said entrance is moved along a surface of said mask in synchronism with the movement of said exit.

7. A magnetic pattern forming method according to claim 6, wherein, in a case in which said magnetic disk and said mask are rotated at speeds equal to each other, a ratio of an entrance moving speed to an exit moving speed is set on the basis of the one of said one-to-one ratio and said predetermined reduction ratio so that said entrance and said exit are moved on the basis of said speed ratio.

8. A magnetic pattern forming method according to claim 6, wherein said magnetic disk and said mask are rotated coaxially.

9. A magnetic pattern forming method according to claim 3, wherein an optical system for the projection includes an entrance positioned in opposed relation to said mask, an exit positioned in opposed relation to said magnetic disk and a main part making connection between said entrance and said exit, with said main part being rotated around a supporting point at which said main part is supported, and for said scan with said energy beam, said projection optical system being rotated along surfaces of said magnetic disk and said mask.

10. A magnetic pattern forming method according to claim 9, wherein, in a case in which said magnetic disk and said mask are rotated at speeds equal to each other, a ratio of a distance between said supporting point and said entrance to a distance between said supporting point and said exit is set on the basis of the one of said one-to-one ratio and said predetermined reduction ratio.

11. A magnetic pattern forming method according to claim 3, wherein said mask is formed according to a mask pattern, and has a transmissive part allowing said energy beam to pass.

12. A magnetic pattern forming method according to claim 3, wherein a shading plate is interposed between said mask and said magnetic disk.

13. A magnetic pattern forming method according to claim 3, wherein a minimum width of said magnetic pattern is set to be less than or equal to 2 μm.

14. A magnetic pattern forming method according to claim 3, wherein said magnetic pattern includes one of a servo pattern for positional control of a recording/reproducing head and a standard pattern for recording of said servo pattern.

15. A magnetic disk on which a magnetic pattern is formed through the use of the magnetic pattern forming method according to claim 3.

16. A magnetic recording apparatus comprising a magnetic disk, a drive section for driving said magnetic disk in a recording direction, a magnetic head including a recording section and a reproducing section, moving means for moving said magnetic head relatively with respect to said magnetic disk, and recording/reproduced signal processing means for making an input of a recording signal to said magnetic head and making an output of a reproduced signal through said magnetic head, with a magnetic pattern being formed on said magnetic disk through the use of the magnetic pattern forming method according to claim 3.

17. A magnetic pattern forming apparatus made to form a desired magnetic pattern on a magnetic disk having a magnetic layer on a substrate, said apparatus comprising:

a mask having a pattern identical or similar to said desired magnetic pattern;

a projection optical system for applying a spot-like energy beam, incident through said mask thereon, to the magnetic disk for heating said magnetic layer and for projecting the mask pattern onto the magnetic disk at one of a one-to-one ratio and a predetermined reduction ratio;

magnetic field applying means for exposing said magnetic disk to an external magnetic field; and control means for making a scan with said spot-like energy beam in radial directions of said magnetic disk and said mask while rotating said magnetic disk and said mask.

18. A magnetic pattern forming apparatus according to claim 17, further comprising:

disk rotating means for driving said magnetic disk rotationally; and a mask rotating means for driving said mask rotationally, said control means controlling said disk rotating means and said mask rotating means.

19. A magnetic pattern forming apparatus according to claim 17, wherein said magnetic field applying means is mounted on a tip portion of an exit of said projection optical system.

20. A magnetic pattern forming apparatus according to claim 17, further comprising:

a disk stage for holding said magnetic disk rotatably; and a mask stage for holding said mask rotatably, said control means moving said disk stage and said mask stage in a synchronized condition with respect to said projection optical system.

21. A magnetic pattern forming apparatus according to claim 20, wherein said control means controls rotational speeds of said magnetic disk and said mask to speeds equal to each other, and controls moving speeds of said mask stage and said disk stage on the basis of a ratio of a moving speed of said mask stage to a moving speed of said disk stage, set on the basis of the one of said one-to-one ratio and said predetermined reduction ratio.

22. A magnetic pattern forming apparatus according to claim 17, wherein said projection optical system includes an entrance positioned in opposed relation to said mask and an exit positioned in opposed relation to said magnetic disk which are constructed in a separate condition, with said control means moving said entrance and said exit in a synchronized condition so that said exit moves along a surface of said magnetic disk and said entrance moves along a surface of said mask.

23. A magnetic pattern forming apparatus according to claim 22, wherein said control means controls rotational speeds of said magnetic disk and said mask to speeds equal to each other, and controls moving speeds of said entrance and said exit on the basis of a ratio of a moving speed of said entrance to a moving speed of said exit set on the basis of the one of said one-to-one ratio and said predetermined reduction ratio.

24. A magnetic pattern forming apparatus according to claim 22, further comprising disk/mask rotating means for rotationally driving said magnetic disk and said mask coaxially so that said control means controls said disk/mask rotating means to make said magnetic disk and said mask rotate at speeds equal to each other.

25. A magnetic pattern forming apparatus according to claim 17, wherein said projection optical system includes an entrance positioned in opposed relation to said mask, an exit positioned in opposed relation to said magnetic disk and a main part making connection between said entrance and said exit, and is rotatable around a supporting point at which said main part is supported, and said control means rotates said projection optical system so that said exit is moved along a surface of said magnetic disk and said entrance is moved along a surface of said mask.

26. A magnetic pattern forming apparatus according to claim 25, wherein a ratio of a distance between said supporting point and said entrance and a distance between said supporting point and said exit is set on the basis of the one of said one-to-one ratio and said predetermined reduction ratio, and said control means controls rotational speeds of said magnetic disk and said mask to speeds equal to each other.

27. A magnetic pattern forming apparatus according to claim 17, wherein said mask is formed in accordance with said mask pattern and has a transmissive part allowing said energy beam to pass.

28. A magnetic pattern forming apparatus according to claim 17, wherein a shading plate is interposed between said mask and said magnetic disk.

29. A magnetic pattern forming apparatus according to claim 17, wherein a minimum width of said magnetic pattern is set to be less than or equal to 2 $\mu$m.

30. A magnetic pattern forming apparatus according to claim 17, wherein said magnetic pattern includes one of a servo pattern for positional control of a recording/reproducing head and a standard pattern for recording of said servo pattern.

* * * * *